United States Patent
Wood et al.

(10) Patent No.: US 6,641,401 B2
(45) Date of Patent: Nov. 4, 2003

(54) INTERACTIVE APPARATUS WITH TEMPLATES

(75) Inventors: Michael C. Wood, Orinda, CA (US); Tracey Hope Jedrzejek, San Francisco, CA (US); Richard Glen Freeman, San Carlos, CA (US); Mark Flowers, Los Gatos, CA (US); Eric Thomas Shuler, Piedmont, CA (US); Margaret E. Grunert, Sunnyvale, CA (US); Jason Avery, Berkeley, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 0 days.

(21) Appl. No.: 09/886,399

(22) Filed: Jun. 20, 2001

(65) Prior Publication Data
US 2002/0197587 A1 Dec. 26, 2002

(51) Int. Cl.[7] .................... G09B 19/00; G09B 19/06
(52) U.S. Cl. .................. 434/159; 434/350; 434/335; 434/171
(58) Field of Search .................... 434/159, 350, 434/169, 167, 171, 172, 335, 339, 340, 429

(56) References Cited

U.S. PATENT DOCUMENTS

| | | | |
|---|---|---|---|
| 4,079,194 A | | 3/1978 | Kley |
| 4,425,099 A | | 1/1984 | Naden |
| 4,609,356 A | * | 9/1986 | Gilden et al. ............... 434/330 |
| 4,739,299 A | | 4/1988 | Eventoff et al. |
| 5,027,523 A | * | 7/1991 | MacLeod .................... 434/171 |
| 5,053,585 A | | 10/1991 | Yaniger |
| 5,217,378 A | | 6/1993 | Donovan |
| 5,329,594 A | * | 7/1994 | Maruno et al. ............. 382/226 |
| 5,401,916 A | | 3/1995 | Crooks |
| 5,442,546 A | * | 8/1995 | Kaji et al. ..................... 704/4 |
| 5,485,176 A | | 1/1996 | Ohara et al. |
| 5,524,522 A | * | 6/1996 | Hesnan ........................ 84/473 |
| 5,604,517 A | | 2/1997 | Filo |
| 5,636,995 A | | 6/1997 | Sharpe, III et al. |
| 5,639,977 A | * | 6/1997 | Hesnan ..................... 84/477 R |
| 5,686,705 A | | 11/1997 | Conroy et al. |
| 5,877,458 A | | 3/1999 | Flowers |
| 5,992,817 A | | 11/1999 | Klitsner et al.q |
| 6,024,571 A | | 2/2000 | Renegar |
| 6,039,625 A | * | 3/2000 | Wang .......................... 446/83 |
| 6,471,420 B1 | | 10/2002 | Maekawa et al. |

FOREIGN PATENT DOCUMENTS

| | | | | |
|---|---|---|---|---|
| DE | 199 02 544 A1 | * | 8/2000 | ............ A63F/9/18 |
| JP | 2000-67164 A | * | 3/2000 | ............ G06K/9/62 |
| JP | 2002-83296 A | * | 3/2002 | ............ G06T/7/00 |

OTHER PUBLICATIONS

U.S. patent application Ser. No. 09/886,401, Wood et al., filed Jun. 20, 2001.

"New Preschool Toys From Fisher–Price Give a Voice To Fun, Creativity And Interactive Play This Holiday Season", Mattel, Inc.: Investor Relations, http://www.shareholder.com/mattel/news/20000601–43282.cfm, 3 pp.

* cited by examiner

*Primary Examiner*—Hieu T. Vo
(74) *Attorney, Agent, or Firm*—Townsend, Townsend & Crew LLP

(57) ABSTRACT

An interactive apparatus is disclosed. In one embodiment, the interactive apparatus includes a base unit. The base unit can has a surface and an array of electrical elements under the surface. A removable template is placed on the base unit and is positioned over the surface. The removable template has a movable element that the user can move and a speaker in the apparatus can produce an audio output in response to the movement of the movable element.

38 Claims, 13 Drawing Sheets

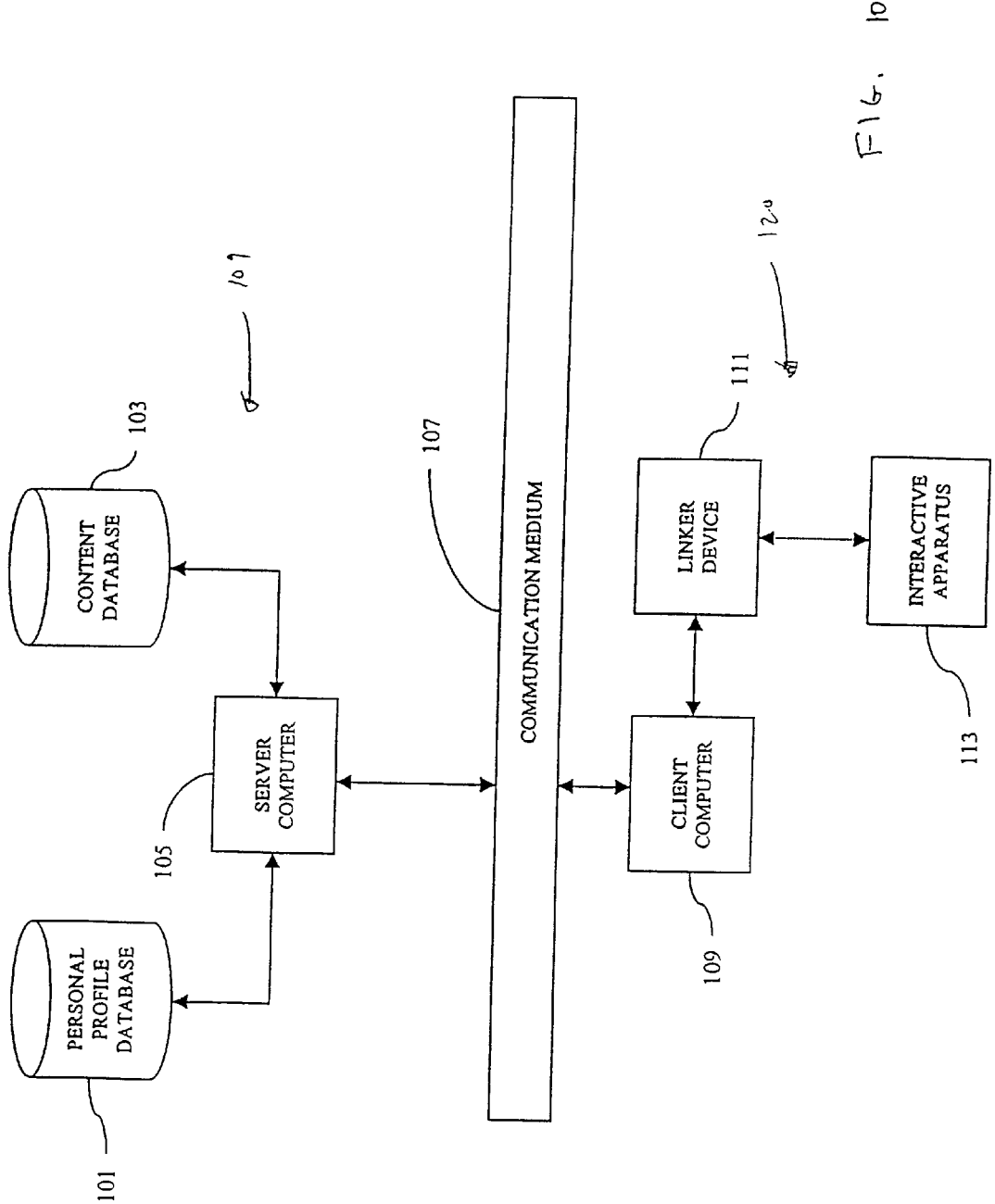

FIG. 11
Activity Mode - Page P

| Shape/Object | Software cues | Click type | Activity Mode: audio* Leap as narrator |
|---|---|---|---|
| Background | Underlying music plays while waiting for a Correct answer | | underlying music |
| Question #1 | There can be three questions which can be programmed sequentially, so that the child doesn't get the same sequence of questions each time. Default to music after question is asked | Question #1 of 3 w/o any coloring | Can you find the letter "P"? |
| Question #1 Hints | After 1st 5 seconds of inactivity | | 1a) We're looking for the letter "P" |
| | After 2nd 5 seconds of inactivity | | 1b) Can you find the letter "P" |
| | After 3rd 5 seconds of inactivity, go to sleep | | 1c) Thanks for learning with LeapFrog! Bye-Bye! |
| Correct Answer: Big Shape P (Big Letter) | Kill music | dt or drag | a1. Correct answer sfx |
| | | dt or drag | a2. Hooray! You found the letter "P"! |
| Correct Answer: Letter "P" with line under it | Kill music | dt or drag | a1. Correct answer sfx |
| | | dt or drag | a2. Way to go! You found the Letter "P"! |
| Correct Answer: word pie inside bubble | Kill music | dt or drag | a1. Correct answer sfx |
| | | dt or drag | a2. Great Job! You found the letter "P" in the word pie . |
| | Please apply audio to all questions: After a correct answer response | dt or drag | Let's play again! |
| Incorrect Answer: Hint #1 | After 1st incorrect answer | dt or drag | a1. [Shape phrase]. We're looking for the letter "P". |
| Hint #2 | After 2nd incorrect answer | dt or drag | a2. [Shape phrase]. We're looking for the letter "P". The letter "P" is big! |
| Hint #3 | After 3rd incorrect answer. Question #2 will kick in when finished. | dt or drag | a3. [Shape phrase]. Let's try another one. |
| Shape Phrase: Leap | | dt or drag | 1. I'm Leap! |
| Tad | | dt or drag | 1. I'm Tad! |
| The Pie | | dt or drag | 1. That's a piece of pie ! |
| Edison | | dt or drag | 1. I'm Edison! |
| Letter "I" | | dt or drag | 1. That's the letter "I"! |
| Letter "E" | | dt or drag | 1. That's the letter "E"! |
| The Pan | | dt or drag | null |
| Question #2 | Question #2 will kick in after question #1 is finished. Default to music after question is asked | dt or drag -Question #2 of 3 | Can you find the piece of pie? |

FIG. 11
Activity Mode - Page P

| Shape/Object | Software cues | Click type | Activity Mode: audio* Leap as narrator |
|---|---|---|---|
| Background | Underlying music plays while waiting for a Correct answer | | underlying music |
| Question #1 | There can be three questions which can be programmed sequentially, so that the child doesn't get the same sequence of questions each time. Default to music after question is asked | Question #1 of 3 w/o any coloring | Can you find the letter "P"? |
| Question #1 Hints | After 1st 5 seconds of inactivity | | 1a) We're looking for the letter "P" |
| | After 2nd 5 seconds of inactivity | | 1b) Can you find the letter "P" |
| | After 3rd 5 seconds of inactivity, go to sleep | | 1c) Thanks for learning with LeapFrog! Bye-Bye! |
| Correct Answer: Big Shape P (Big Letter) | Kill music | dt or drag | a1. Correct answer sfx |
| | | dt or drag | a2. Hooray! You found the letter "P"! |
| Correct Answer: Letter "P" with line under it | Kill music | dt or drag | a1. Correct answer sfx |
| | | dt or drag | a2. Way to go! You found the Letter "P"! |
| Correct Answer: word pie inside bubble | Kill music | dt or drag | a1. Correct answer sfx |
| | | dt or drag | a2. Great Job! You found the letter "P" in the word pie. |
| | Please apply audio to all questions: After a correct answer response | dt or drag | Let's play again! |
| Incorrect Answer: Hint #1 | After 1st incorrect answer | dt or drag | a1. [Shape phrase]. We're looking for the letter "P". |
| Hint #2 | After 2nd incorrect answer | dt or drag | a2. [Shape phrase]. We're looking for the letter "P". The letter "P" is big! |
| Hint #3 | After 3rd incorrect answer. Question #2 will kick in when finished. | dt or drag | a3. [Shape phrase]. Let's try another one. |
| Shape Phrase: Leap | | dt or drag | 1. I'm Leap! |
| Tad | | dt or drag | 1. I'm Tad! |
| The Pie | | dt or drag | 1. That's a piece of pie! |
| Edison | | dt or drag | 1. I'm Edison! |
| Letter "I" | | dt or drag | 1. That's the letter "I"! |
| Letter "E" | | dt or drag | 1. That's the letter "E"! |
| The Pan | | dt or drag | null |
| Question #2 | Question #2 will kick in after question #1 is finished. Default to music after question is asked | dt or drag -Question #2 of 3 | Can you find the piece of pie? |

FIG. 11
Activity Mode - Page P

| | | | |
|---|---|---|---|
| Question #2 Hints | After 1st 5 seconds of inactivity | | 2a) We're looking for the piece of pie. |
| | After 2nd 5 seconds of inactivity | | 2b) Can you find the piece of pie? |
| | After 3rd 5 seconds of inactivity, go to sleep | | 2c) Thanks for learning with LeapFrog! Bye-Bye! |
| correct answer : The piece of pie | Kill music | dt or drag | a1. Correct answer sfx |
| | Kill music | dt or drag | a2. Hooray! You found the piece of pie! |
| correct answer : word pie inside the bubble | Kill music | dt or drag | a1. Correct answer sfx |
| | Kill music | dt or drag | a2. Hooray! You found the word pie! |
| | Please apply audio to all questions: After a correct answer response | dt or drag | Let's play again! |
| Incorrect Answer: Hint #1 | After 1st incorrect answer | dt or drag | a1. [Shape phrase]. We're looking for the piece of pie! |
| Hint #2 | After 2nd incorrect answer | dt or drag | a2. [Shape phrase]. We're looking for the piece of pie! |
| Hint #3 | After 3rd incorrect answer. Question #3 will kick in when finished. | dt or drag | a3. [Shape phrase]. Let's try another one. |
| Shape Phrase: Leap | | dt or drag | 1. I'm Leap! |
| Tad | | dt or drag | 1. I'm Tad! |
| Edison | | dt or drag | 1. I'm Edison! |
| Big Letter "P" / Letter "P" | | dt or drag | 1. That's the letter "P"! |
| Letter "I" | | dt or drag | 1. That's the letter "I"! |
| Letter "E" | | dt or drag | 1. That's the letter "E"! |
| The Pan | | dt or drag | null |
| Question #3 | Question #3 will kick in after question #2 is finished. Default to music after question is asked | dt or drag Question #3 of 3 | Can you find Tad? |
| Question #3 Hints | After 1st 5 seconds of inactivity | | 3a) We're looking for Tad. |
| | After 2nd 5 seconds of inactivity | | 3b) Can you find Tad? |
| | After 3rd 5 seconds of inactivity, go to sleep | | 3c) Thanks for learning with LeapFrog! Bye-Bye! |
| Correct answer: Tad | Kill music | dt or drag | a1. Correct answer sfx |
| | | dt or drag | a2. Great Job! You found Tad! |
| | Please apply audio to all questions: After a correct answer response | dt or drag | Let's play again! |
| Incorrect Answer: Hint #1 | After 1st incorrect answer | dt or drag | a1. [Shape phrase]. We're looking Tad! |
| Hint #2 | After 2nd incorrect answer | dt or drag | a2. [Shape phrase]. We're looking for Tad! |
| Hint #3 | After 3rd incorrect answer. Question #1 will kick in when finished. | dt or drag | a3. [Shape phrase]. Let's try another one. |

FIG. 11
Activity Mode - Page P

| Shape Phrase: Leap | | dt or drag | 1. I'm Leap! |
|---|---|---|---|
| The piece of pie | | dt or drag | 1. That's a piece of pie! |
| Word inside bubble | | dt or drag | 1. That's the word pie! |
| Edison | | dt or drag | 1. I'm Edison! |
| Big Letter "P" / Letter "P" | | dt or drag | 1. That's the letter "P"! |
| Letter "I" | | dt or drag | 1. That's the letter "I"! |
| Letter "E" | | dt or drag | 1. That's the letter "E"! |
| The Pan | | dt or drag | null |

INTERACTIVE APPARATUS WITH TEMPLATES

BACKGROUND OF THE INVENTION

Toys that have the ability to produce noises and sounds have become extremely popular in recent years with children. In this regard, a number of toys have been developed that speak or talk when a child pushes a button on a toy. After pushing the button, the toy produces a prerecorded sound. For example, a toy might have a button with the letter "E" printed on it. After a child presses the letter "E", the toy says the sound of the letter E (i.e., "eeee").

Such toys could be improved. For example, over time, a child can become familiar with the responses from the toy. The child learns that by pushing on a certain part of the toy, the toy produces the same sound over and over again. The same set of buttons with the same corresponding set of sounds is always presented to the user. Consequently, learning and play can become predictable and repetitious. The child can lose interest in the toy and the educational and entertainment value of the toy to the child diminishes.

In addition, such toys have limited ways of reinforcing learning in a child and few ways to stimulate a child. In many conventional electronic toys, the only interaction that a child has with the toy is pressing buttons. It would be desirable if an electronic toy had more functionality and more ways to stimulate and engage a child.

Embodiments of the invention address these and other problems.

SUMMARY OF THE INVENTION

One embodiment of the invention is directed to an interactive apparatus comprising: a) a base unit comprising i) a substantially planar surface and ii) an array of electrical elements under the surface, b) a processor operatively coupled to the array of electrical elements; c) a memory operatively coupled to the processor; d) an audio output device operatively coupled to the processor; and e) a removable template over the surface of the base unit, wherein the removable template comprises a movable element that is over an electrical element in the array of electrical elements, wherein the electrical element is assigned to provide audio output that is related to the movable element.

Another embodiment of the invention is directed to an interactive apparatus comprising: a) a base unit comprising i) a surface, ii) an array of switches under the surface, iii) a memory, iv) a processor operatively coupled to the array of switches and the processor, v) a slot, and vi) a speaker; b) a transferable information storage medium removably insertable in the slot; and c) a removable template over the surface of the base unit, wherein the removable template comprises a stationary portion and a plurality of movable elements, wherein each of the movable elements is capable of being moved while the stationary portion remains stationary and has a structure that is distinct from the stationary portion, and wherein the plurality of movable elements are disposed over a set of switches within the array of switches, each switch within the set of switches being assigned to provide output relating to the movable element that is disposed over the switch.

Another embodiment of the invention is directed to a method of using an interactive apparatus, the method comprising: a) providing a base unit comprising a substantially planar surface; b) placing a removable template over the substantially planar surface; c) moving a movable element in the removable template; and d) producing an audio output that relates to the movable element in response to moving the movable element.

Another embodiment of the invention is directed to a removable template for use over a surface of a base unit of an interactive apparatus, the removable template comprising: a) a stationary region; and b) a movable element that is structurally distinct from the stationary region and moves independently of the stationary region, and wherein the movable element comprises an upper portion capable of being moved by a user and a lower portion capable of contacting the surface in response to the movement by the user, and wherein the base unit produces an audio output that is related to the movable element moved by the user.

These and other embodiments of the invention can be described with reference to the foregoing Figures.

BRIEF DESCRIPTION OF THE DRAWINGS

FIG. 11 shows a table of script that can be used in an embodiment of the invention.

DETAILED DESCRIPTION

Figure 1:
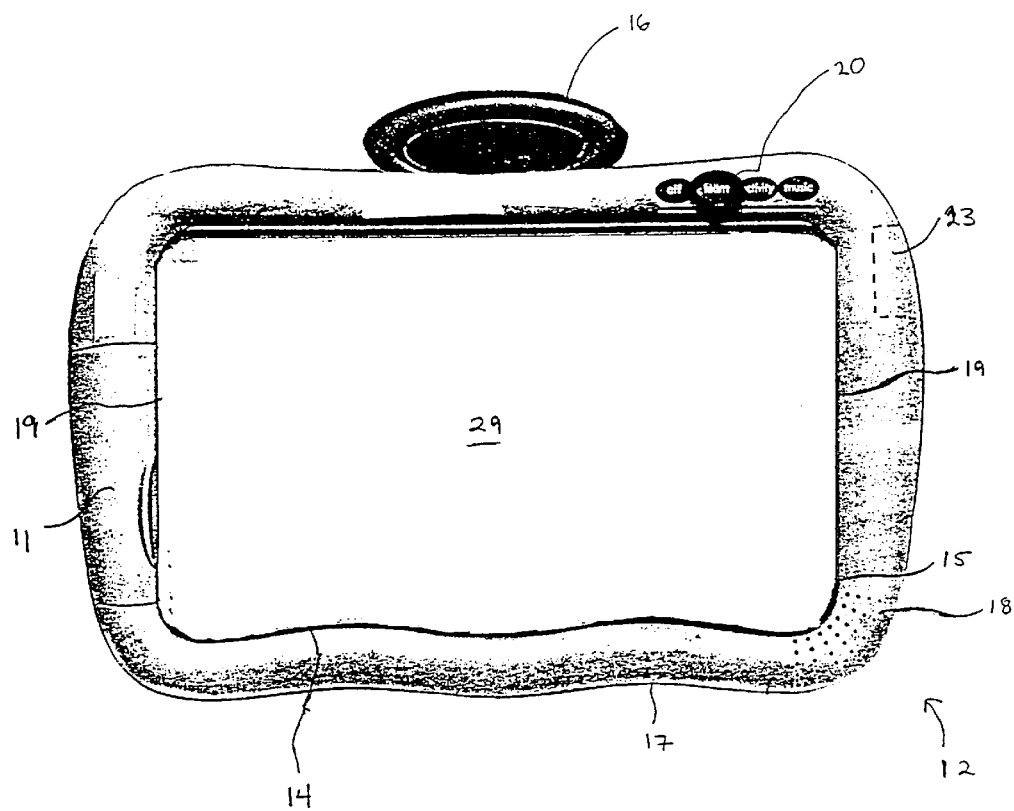
FIG. 1 shows a plan view of a base unit of an interactive apparatus according to an embodiment of the invention.

Embodiments of the invention are directed to an interactive apparatus comprising a base unit and a removable template that is used with the base unit. In some embodiments of the invention, the removable template may have movable elements such as buttons. When a movable element is moved, the base unit produces an output for the user. The output can be audio output such as music or synthesized speech. The music or synthesized speech preferably relates to the movable element being moved by the user. For example, if the user presses a button in the form of a red lilypad in the removable template, the base unit says the word "red" or "red lilypad".

Additionally or alternatively, in some embodiments of the invention, the removable template can be configured to secure a sheet such as a piece of paper to the base unit. These removable templates may or may not have movable elements such as buttons. When the sheet of paper is on the base unit, the user may interact with the print elements (e.g., drawings, words, letters) on the sheet. For example, the user can apply pressure to a drawing on a sheet of paper or color a drawing with a marking instrument such as a crayon. In response to this, the base unit can produce an output for the user. The output can be audio output such as music or synthesized speech. Regardless of the form of the output, the output preferably relates to the particular print element that the user is interacting with. For example, if the user is coloring the letter B on a sheet of paper, the output provided to the user may be synthesized speech such as "B, B says buh".

The base unit that supports the removable template comprises a major surface. The major surface may be uneven but is preferably a flat surface so that a user can write on the surface. When the removable template is on the base unit, it can be in direct contact with the major surface or spaced from the major surface. The major surface can be smooth and washable so that markings such as crayon marks can be easily removed from it.

An array of electrical elements is underneath the major surface. In some embodiments, each electrical element is a pressure-sensitive switch that is activated by pressure. A suitable pressure-sensitive switch may, for example, comprise conductive regions that are separated by an air gap. Pressure applied to the conductive regions causes them to contact each other closing the switch. Another type of electrical element may be a piezoelectric type element. The application of pressure to a piezoelectric type element causes it to change resistance. In either case, pressure can be applied by, for example, a movable element, a stylus (e.g., a marking instrument such as a crayon), or even a finger that is above the electrical element.

In other embodiments, the electrical elements can be antennas such as those described in U.S. Pat. Nos. 5,877,458 or 5,686,705, and U.S. patent application Ser. No. 09/574,599 and No. 60/200,725. All of these patents and patent applications are assigned to the same assignee as the present application and are incorporated herein by reference in their entirety for all purposes. The antennas can transmit signals that can be received by a stylus that is coupled to the base unit. The stylus acts as a receiving antenna. When the stylus is positioned over the major surface, the stylus receives a signal that is particular for the electrical element underneath the stylus. Then, the position of the stylus relative to the major surface can be determined. In these embodiments, the stylus can be used to move the movable elements in a removable template on the base unit. The stylus could also be used to interact with print elements in a sheet that is secured to the base unit with a removable template. Also, in these embodiments, the electrical elements may be transmitting antennas that regularly transmit signals that are received by the stylus. In these embodiments, a user need not selectively activate the electrical elements. Alternatively, the stylus may act as a transmitting antenna and the underlying antenna (i.e., electrical element) may be a receiving antenna.

In embodiments of the invention, some or all of the electrical elements in the array of electrical elements can be pre-assigned to retrieve and provide specific outputs for the user. Preferably, the electrical elements retrieve the pre-assigned outputs after they are activated. In addition, some of the electrical elements can be pre-assigned to indicate that a different removable template is on the base unit when they are activated. For example, once an electrical element associated with a new removable template is activated, a processor can reprogram the interactive apparatus so that the electrical elements in the array are re-assigned to retrieve outputs associated with the new removable template.

The output provided to the user by the interactive apparatus may be visual output and/or audio output. Audio output is preferred as audio output can supplement and reinforce visual information such as letters, pictures, and numbers that may be on the removable templates or on the sheets. Exemplary output can include letters, numbers, words, phrases, jokes, music, questions, answers, prompts, sound effects, facts, etc.

In some embodiments, the output can prompt the user for a response. For example, an exemplary question that the interactive apparatus might ask the user may be "Can you find the green triangle?" In response, the user can move a movable element that is associated with a green triangle. After the user responds, output relating to the correctness or the incorrectness of the user's response can be provided to the user. For example, if the user's response is correct, a reward output (e.g., "that's right!") can be provided to the user. If the response is incorrect, the question can be repeated or the user can be informed that the response was incorrect.

In other embodiments, the output provided by the interactive apparatus can include clues that help the user answer a question that was previously presented by the interactive apparatus. For example, an initial question presented to the user may be "Press the number 10". If the user does not press the number 10 after a predetermined period of time, or if the user presses the wrong number, the interactive apparatus can invite the user to press a different button and obtain a clue. For example, the interactive apparatus can prompt the user to "Touch Dan the dog to receive a clue". After the user presses this button, the apparatus can provide a clue such as "The number 10 comes after the number 9" to the user. Providing clues to the user can help the user learn about a given subject.

As noted, in embodiments of the invention, the output provided to the user can relate to a particular movable element that is moved by the user or can relate to a specific print element with which the user is interacting. So, for example, the same output is not produced when the user presses a green movable element and a red movable element. Rather, different outputs that specifically relate to the movable elements are presented to the user. For instance, phrases such as "green" and "red" are provided to the user after the user presses green and red movable elements, respectively.

The output can have some relationship to the information conveyed by the print element or the movable element. For instance, the output can relate to the identity, form, color, shape, or quality of a movable element, or a print element in a sheet. For example, after coloring on a drawing of a frog on a sheet of paper on the base unit with a crayon, the phrase "Hi, I'm Leap!" can be retrieved from memory and a speaker in the base unit can sound the phrase to the user. Alternatively or additionally, the output can provide additional information about a particular print element or a movable element. For example, a print element or a movable element can be in the form of a state such as California. After the user interacts with the movable element or the print element, information such as the population, the history, and/or the area of the state can be presented to the user.

Many different removable templates can be used with the base unit. In a set of removable templates, each removable template can have a different appearance and/or can be adapted to educate the user about a different subject.

Preferably, the removable templates have bright colors and/or two or three-dimensional characters (e.g., animated figures). Features such as these can invite a child to interact with the interactive apparatus. Each removable template can be made of plastic and can be rigid or flexible. Rigid removable templates are preferred as they can be easily manipulated by children and are easier to align. In some embodiments, the removable templates comprise a substantially planar layer of molded plastic. Moreover, the removable templates can have any suitable planar dimensions or thickness. For example, a typical removable template can have a thickness that is less than about 0.5 inches and planar dimensions greater than about 8.5×11 square inches.

Each removable template can have a stationary portion and movable elements that move substantially independently of the stationary portion. Each movable element may have a structure and an appearance that is distinct from the stationary portion. For example, in some embodiments, the movable elements may be buttons that are disposed in apertures in the stationary portion. The buttons are coupled to the walls of the apertures with flexible connectors that allow the buttons to move substantially independently of the stationary portion. In some embodiments, the movable elements can also be disposed in elongated apertures (i.e., with respect to the plane of the removable template) in the removable template. A movable element can move within an elongated aperture and also in a direction parallel to the orientation of the removable template.

Each movable element can have an upper and a lower portion. In some embodiments, both of the upper and the lower portions can move vertically with respect to the plane of the removable template. A depressible button is an example of a movable element of this type. In other embodiments, each movable element can have an upper portion that moves horizontally with respect to the plane of the removable template. The upper portion of a movable element can rotate, move side-to-side, or up and down, in the plane of the removable template. Such movable elements can simulate the natural movement of an object so that the user is invited to interact with them. For example, the upper portion of a movable element may be in the form of a wheel. The wheel can form a part of a depiction of a transportation vehicle on the removable template. The wheel can rotate in the plane of the removable template to simulate the natural motion of a wheel. As the user rotates the wheel, the user applies some pressure in a downward direction. This causes a lower portion of the movable element to move downward and contact the major surface. In other embodiments, a lower portion of the movable element moves up and down (perpendicular to the plane of the removable template) in response to this rotation. Gears can be used to translate the motion of the movable element portions. When the lower portion of the movable element moves downward, it can contact the major surface to activate the appropriate electrical element underneath the major surface. In either case, the sound of the wheels of a train can be produced in response to the user's rotation of the wheel.

In embodiments of the invention, the removable templates are easily removable from the base unit. The user need not use any special tools or procedures to remove and separate the removable templates from the base unit. Preferably, a removable template can rest on the major surface of the base unit without the use of clips or adhesives. In this regard, different removable templates having different types, patterns, or sizes of movable elements can be interchangeably placed on the major surface of the base unit without difficulty. The interface presented to the user can be readily changed. As the removable templates are changed, the look, feel, and functionality of the interactive apparatus changes. In comparison to many conventional electronic toys, a child need not be presented with the same set of buttons and the same corresponding set of sounds each time the child uses the interactive apparatus. Consequently, children are less likely to become disinterested using embodiments of the invention than conventional electronic toys.

The interactive apparatus can be used for any intended purpose. For example, it can be used to entertain and/or educate the user. In some embodiments, the removable templates or the sheets can be designed so that the user can play games. For example, a sheet that is secured to the base unit may have a maze printed on it. The user can use a pencil or other writing instrument to trace a path through the maze. Pressure is applied to the major surface under the sheet using the pencil. Electrical elements underneath the pencil are activated and a processor in the base unit can electronically track the path of the pencil. Audio output (e.g., "wrong way!") can be provided to the user if the user strays from the correct path in the maze. In other embodiments, the removable templates can be designed to simulate representations of utilitarian objects. For example, the templates can be designed as children's representations of utilitarian objects such as telephones, computer keyboards, control panels (e.g., for a space ship or car), etc. Each of these utilitarian objects has movable elements that can be moved by a user. Upon moving the movable elements, sounds can be produced in response. For example, a removable template can be in the form of a telephone keypad and the movable elements in the removable template can be the buttons for the keypad. When the user depresses a button, a lower portion of the button can contact the major surface. The sound of an ordinary telephone button can then sound from a speaker in the base unit.

In yet other embodiments, the removable templates can be designed to specifically educate the user about a predetermined subject. For example, the interactive apparatus and the removable templates can be designed to teach a user about colors, letters, shapes, numbers, word pronunciation, phonics, current events, songs, general math, algebra, subtraction, multiplication, division, fractions, decimals, geometry, science, geography, history, spelling, grammar, the names and sounds of musical instruments, people, places, nature, music, sports, letters, numbers, counting, social studies, creative expression, languages such as English and Chinese, etc. The skills taught by the interactive apparatus can include recognition skills (e.g., number and letter recognition) and logic skills. Accordingly, in some embodiments, the interactive apparatus can be characterized as an educational toy.

Although the interactive apparatus has been described as an educational toy, in other embodiments, the interactive apparatus need not be a children's toy and could be used by adults. For example, in some embodiments, the different removable templates and/or different sheets that are used with the base unit can be designed for people who speak different languages. The interactive apparatus can be reprogrammed to provide output that is specific to the removable templates or sheets, and that is also relevant to the different types of users. Many different templates can be used with one base unit and can be used by different types of people.

The user of the interactive apparatus can be of any suitable age (e.g., an adult or child). For example, the user can be a child that is less than about 10 years old (e.g., a pre-school age child between about 3 to about 5 years old). In embodiments of the invention, the interactive apparatus engages children with talking characters, music, sounds, and fun learning activities. Important skills (e.g., preschool skills) can be taught to children while encouraging creativity, self-expression and imagination.

Illustratively, in one embodiment of the invention, a first removable template and a second removable template can be used with a single base unit. The first removable template can be designed to teach a child the letters of the alphabet. The movable elements in the first removable template may be buttons that are in the form of the letters A through Z. The movable elements in the second removable template are different than the movable elements in the first removable template. Instead of having movable elements in the form of letters, the movable elements in the second removable template can be in the form of numbers. For example, the movable elements in the second removable template may be a plurality of buttons that are in the form of the numbers 1 through 10.

The first removable template can be placed on the base unit. When a user moves a movable element in the first removable template, the movable element interacts with one or more electrical elements in the array of electrical elements underneath the movable element being moved. The one or more electrical elements can be activated in response to the interaction with the movable element. An output is then provided to the user in response to the movement of the movable element. For example, after a user depresses a button in the form of a letter A in the first removable template, a lower portion of the button contacts the major surface of the base unit. Pressure is applied to the major surface of the base unit and the applied pressure activates a pressure-sensitive switch within an array of switches underneath the major surface. After the switch is activated, a processor within the base unit retrieves audio data that corresponds to the button being pressed. The audio data can be converted to sound that comes from a speaker in the interactive apparatus. For example, after pressing the button shaped as the letter A, the data for the phrase "A, A says ah" can be retrieved from memory and a speaker in the base unit can sound the phrase "A, A says ah".

After the user is finished using the first removable template, the first removable template can be removed from the base unit. The second removable template can then be placed on the base unit in its place. When the user actuates the movable elements in the second removable template, the interactive apparatus produces different outputs than the outputs that were produced when the first removable template was used. For example, after the user depresses a button in form of the number 7 in the second removable template, a lower portion of the button contacts the major surface of the base unit. Pressure is applied to the major surface of the base unit under the button. A switch under the button and the major surface is activated. The switch is assigned to provide audio output that relates to the number 7. For example, the audio provided to the user after the user presses the button in the form of the number 7 can be "seven, there are seven days in a week".

After the user uses the second removable template, a third removable template, a fourth removable template, etc. may be used on the base unit. The different removable templates may form a set of removable templates. Each of the removable templates in the set can have a different appearance and different movable elements. Different outputs can be produced for each of the different templates. By using different removable templates with the base unit, the look, feel, and the functionality of the interactive apparatus can be readily changed by the user. Consequently, in comparison to many conventional electronic toys, the user is less likely to become disinterested in the interactive apparatus over time because the same set of buttons and the same corresponding output are not presented to the user over and over again.

FIG. 1 shows a base unit 12 of an interactive apparatus according to an embodiment of the invention. The base unit 12 includes an edge region 17 that surrounds a major surface 29 of the base unit 12. The edge region 17 and other parts of the base unit 17 can be made of molded plastic. The underside of the base unit 12 may have a storage recess for storing one or more removable templates (not shown) when they are not in use.

A handle 16 is attached to the edge region 17. The handle 16 may be retractable or detachable from the main body of the base unit. Using the handle 16, the user can easily transport the base unit and the removable templates (not shown). Accordingly, the interactive apparatus can be portable and can be carried by a young child. In this regard, the interactive apparatus can have planar dimensions that are less than about 3 ft. by about 3 ft. For example, the base unit 12 may have dimensions of approximately 13"×18.75"×3" (W×L×H).

The edge region 17 of the base unit 12 can have any suitable features. For example, a covered or uncovered storage space 11 can be in the edge region 17. The storage space can store the user's personal items and writing instruments such as pencils or crayons. In addition, a speaker 18 is in the edge region 17 of the base unit. Pre-recorded or synthesized sounds can be provided to the user through the speaker 18. The sounds can be music, synthesized words, phrases, and word segments, sound effects, etc. A slot 23 (shown by invisible lines) for a transferable information storage medium (not shown) can also be included in the edge region 17. The slot 23 can be cooperatively structured to receive the transferable information storage medium. A spring-loaded door (not shown) can cover the slot 23 and can be pushed inward when, for example, a data cartridge is inserted into the slot 23.

A selecting device 20 is also in the edge region 17 to let the user select a particular mode of operation. As shown in FIG. 1, the selecting device 20 can be in the form a slidable knob. The user can use the selecting device 20 to turn the interactive apparatus on or off. When it is on, the user can further select from a learning mode, a game mode, and a music mode. In the learning mode, the primary output provided by the interactive apparatus can be output that teaches the user about a predetermined subject. For example, when the interactive apparatus is in the learning mode, the user can move a movable element of a particular color or shape, or interact with a print element of a particular color or shape. In response, the interactive apparatus can state the shape and the color of the movable element or the print element to the user. In the game mode, the user can play games or the interactive apparatus can quiz the user. For example, a removable template having buttons in the form of the letters A through Z can be on the base unit. The interactive apparatus may prompt the user by saying "Can you find the letter D?" If the user selects the wrong letter, the interactive apparatus can tell the user the name and sound of the depressed letter (e.g., "B, B says buh."). If the user selects the right letter, the interactive apparatus can reward the user. For example, a congratulatory phrase such as "you did it!" or other rewarding sound effect could be provided to the user in response to the right selection. In the music mode, different musical segments can be produced when different movable elements are moved. For example, if a sheet with print elements is on the base unit, different musical segments can be presented to the user when the different print elements are colored.

In embodiments of the invention, multiple removable templates can be used and each removable template can operate in multiple modes. The interactive apparatus has more functionality than other conventional electronic toys. Consequently, the user is less likely to become disinterested with the interactive apparatus. Moreover, concepts taught in these different modes can be reinforced in the user in different ways. For example, learning the letters of the alphabet can be reinforced by a combination of declaratory instruction, interrogatories (e.g., quizzing), games, and music. The user is more likely to learn about a particular concept when there are multiple different ways to present the concept to the user.

The major surface 29 can have any suitable characteristics or size. The major surface 29 can be the upper surface of a layer of polyvinyl acetate or other suitable polymeric material. Preferably, the major surface 29 is made of a material that can be easily washed if, for example, crayon markings are made on the major surface. In some embodiments, the major surface 29 can have planar dimensions that are larger than a standard sheet of paper. For example, the major surface 29 can have planar dimensions that are more or less than about 8.5×14 inches. Such larger dimensions can accommodate removable templates that can secure a standard sheet of paper to the base unit 12.

Figure 2:
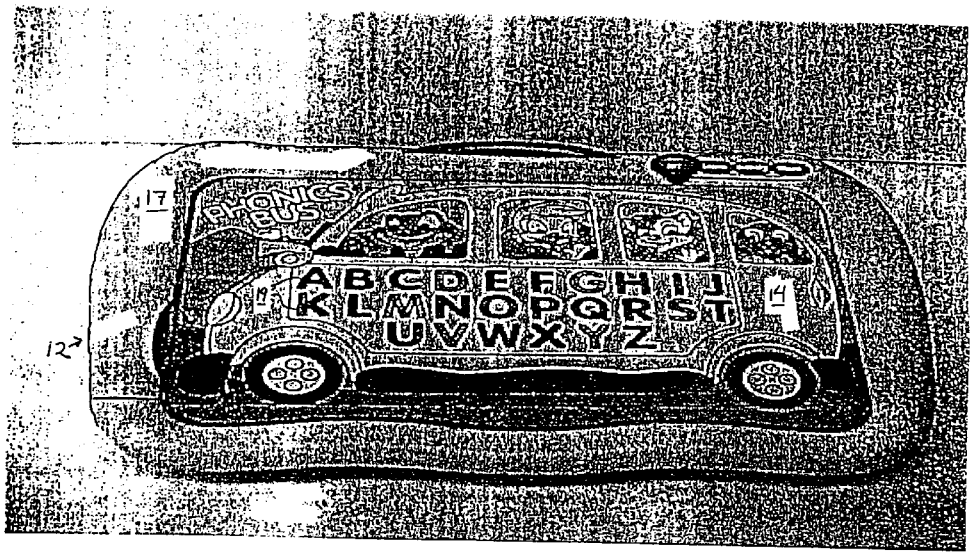
FIG. 2 shows an interactive apparatus according to an embodiment of the invention.

Referring to FIG. 2, a removable template 14 can be placed over the major surface (not shown) of the base unit 12. In this example, the removable template 14 has a drawing of a bus with various characters riding in it. The removable template 14 includes a number of movable elements 19 that are buttons in the form of letters (i.e., a to z). The removable template 14 can be made of molded plastic and can be rigid. The removable template 14 can also be substantially planar.

When the user presses a movable element 19, a lower portion of the movable element 19 can apply pressure to the major surface of the base unit 12 under the removable template 14. The pressure applied to the major surface activates one or more electrical elements underneath the depressed movable element 19. After the one or more electrical elements are activated, a processor in the base unit can retrieve output data related to the letter that is associated with the movable element from memory. Then, the output can be presented to the user. For example, the user may also depress the button that is in the form of the letter "W". In response, the phrase "W, w says wah" can some from a speaker in the base unit of the interactive apparatus.

The edge region 17 in this and other embodiments can be cooperatively structured to receive the removable template 14. In the illustrated example, the edge region 17 is raised with respect to the major surface of the base unit 12 and encircles the major surface. When the removable template 14 is placed over the major surface of the base unit 12, the edge region 17 guides the removable template 14 so that it is correctly positioned over the major surface of the base unit 12. The movable elements 19 are also correctly positioned over the electrical elements under the major surface of the base unit 12. Accordingly, in embodiments of the invention, the removable template 14 can be self-aligning with respect to the major surface of the base unit 12. This makes it easy for a user such as a child to place the removable template 14 on the surface of the base unit 12 and use the interactive apparatus. A user need not worry about aligning the removable template 14 so that the movable elements 19 perfectly correspond to the electrical elements underneath the major surface.

Figure 3:
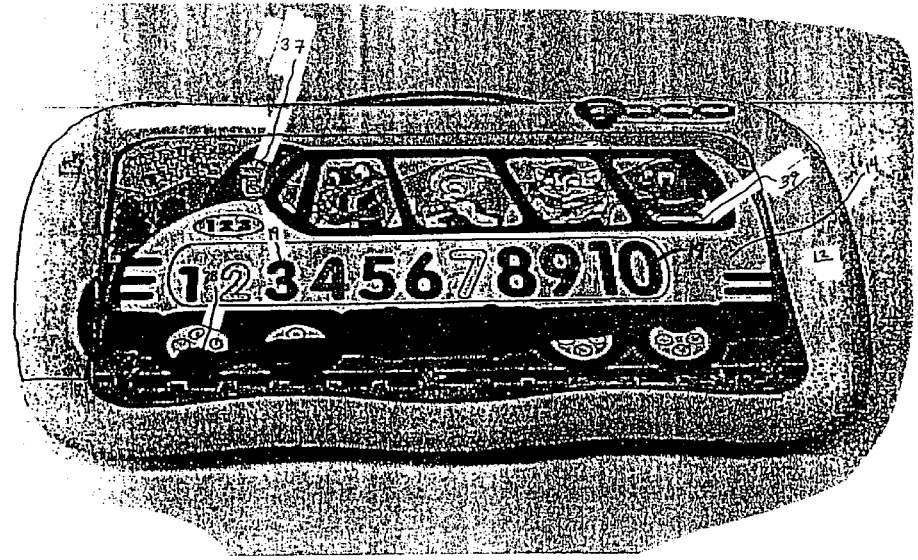
FIG. 3 shows an interactive apparatus according to another embodiment of the invention.

FIG. 3 is a perspective view of another interactive apparatus according to an embodiment of the invention. The interactive apparatus shown in FIG. 3 has the same type of base unit 12 as shown in FIGS. 1 and 2. However, in this interactive apparatus embodiment, a different removable template 14 is on the base unit 12. The removable template 14 in this embodiment shows a train with various characters riding in it. Like the removable template 14 shown in FIG. 2, the removable template 14 shown in FIG. 3 can be made of molded plastic. It can also be rigid and substantially planar.

The removable template 14 shown in FIG. 3 includes a number of movable elements. The movable elements 37, 38, 39 in the removable template 14 can have portions that move in a direction that is parallel to the plane of the removable template 14. For example, the template 14 includes a movable element 38 that is in the form of a wheel of the train. An upper portion of the movable element 38 rotates in a plane parallel to the plane of the removable template 14. When the user moves it, it appears as if the wheels of the train are moving. The movable element 38 can move within a circular, elongated slot (not shown) in the removable template. Moving the upper portion of the movable element 38 causes the lower portion of the movable element 38 to contact the major surface underneath the removable template 14. The removable template 14 also includes a movable element 37 in the form of a whistle. A user can move the whistle up and down within an elongated aperture. The movement of the whistle can cause a lower portion of the movable element 37 to move and contact the major surface underneath the removable template 14. Pressure is applied to the electrical element (not shown) underneath the removable template 14. In response to the applied pressure, a speaker in the base unit 14 can provide the sound of a train whistle to the user. In yet another example, a movable element 39 is in the form of a bus window that can move up and down. The interactive apparatus can produce sounds in response to the movement. Movable elements 19 in the form of depressible buttons are also provided in the removable template 14. Each of the buttons is in the form of a number (e.g., 1 through 10). The user can depress these numbers so that the base unit 12 provides a corresponding audio output. For example, after pressing the number "10", a synthesized voice coming from the speaker can say "ten".

Figure 4:
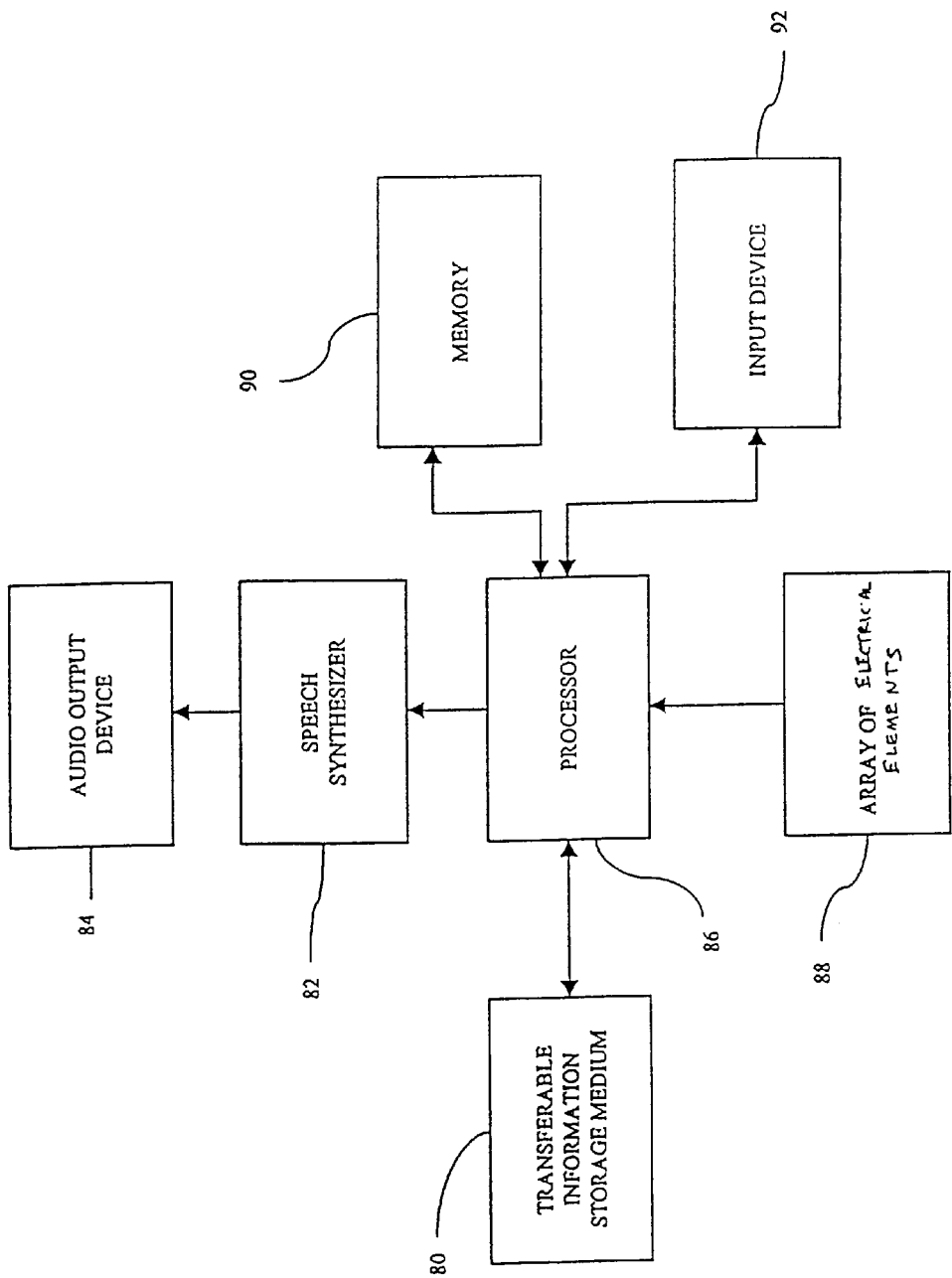
FIG. 4 shows a block diagram of some components that can be used in embodiments of the invention.

FIG. 4 shows a block diagram of some of the components in an interactive apparatus according to an embodiment of the invention. Each of the components shown in FIG. 4 can be housed in a base unit. Some of the components (e.g., the transferable information storage medium 80) can be physically separated from the base unit.

The interactive apparatus includes a processor 86. The processor 60 may be one or more microprocessors that facilitate the operation of the interactive apparatus. In embodiments of the invention, the one or more microprocessors may include an ASIC (application specific integrated circuit).

The processor 86 may be coupled to any suitable electronic component. In FIG. 4, the processor 86 is coupled to a memory 90, an input device 92, and an array of electrical elements 88. A speech synthesizer 82 and an audio output device 84 provide synthesized speech or other audio output for the user. A transferable information storage medium 80 is removably coupled to the processor 80. In some embodiments, the transferable information storage medium 80 is insertable into a slot in the base unit. Data can be retrieved from the base unit or provided to the base unit through the transferable information storage medium.

The speech synthesizer 82 can be a speech synthesizer chip that is separate from a microprocessor that facilitates the interaction between the various components in the interactive apparatus. Alternatively, the speech synthesizer 82 can be incorporated onto a computer chip along with logic circuitry that facilitates the interaction between the various components in the interactive apparatus.

The audio output device 84 provides audio output for the user. Examples of audio output devices include speakers and earphone jacks. Other output devices such as visual output devices (not shown) can be used in addition, or as an alternative, to the audio output device 84. Examples of visual output devices include LCDs (liquid crystal displays).

The memory 90 may be any suitable temporary or permanent information storage device. The memory 90 may include optical, magnetic, or electronic storage media such as optical or magnetic disks, tapes, sticks, and the like. Any suitable combination of information storage devices can collectively make up the memory 90 of the interactive apparatus. In some embodiments, the memory 90 can include one or more RAM (random access memory), ROM (read only memory) and EPROM (erasable programmable memory) chips. For example, the memory 90 can include a ROM chip that has a storage capacity of about 2 megabytes or more.

The memory 90 can store any suitable information. For example, the memory 90 can store electronic maps for the removable templates or the sheets that are used with the base unit. Each electronic map can associate a particular electrical element in the array of electrical elements with a particular output. The particular output can relate to a particular print element on a printed sheet or a particular movable element in a particular removable template. The memory 90 may also store code for the user's name or code to retrieve the user's name, e.g., from a transferable information storage medium. The apparatus can greet the user with the user's first name so that the user's experience is personalized. Code for the outputs provided by the interactive apparatus can also be stored in the memory 90.

In some embodiments, information such as questions, words, pictures, musical sounds, applications, etc. may be stored in libraries of code, libraries of resources, and libraries of applications. These libraries can be present in the memory 90. Information such as this may be stored once in the memory 90 and may be accessed according to a set of instructions provided to the processor 86. Sets of instructions for manipulating data, rather than the data files themselves, can be quickly transferred to and from the interactive apparatus. Large data files such as sound and image files need not be stored in and repeatedly transferred to and from the base unit. Small instruction files may be transferred, thus resulting in faster data transfer and lower memory capacity requirements. Music data, for example, may be quickly transferred to and from the interactive apparatus according to a MIDI (Musical Instrument Digital Interface) or MIDI-like protocol. For example, in some embodiments, actual audio data need not be transferred to and from the base unit, just the instructions to play the audio data. This allows the same audio sequences stored in the base unit to be used multiple times with no additional audio storage required.

Instructions to play audio data may include general audio sequences (GASs). GASs are very compact instructions for specifying and playing audio resources. A single GAS command sequence can specify a complicated sequence of audio. Exemplary GAS commands may include the following:

GAS commands for hGAS_HelloThere
Play hCA_Hello
Wait 0.1 seconds
Play hCA_There

In this example, actual audio data for the words "Hello" and "There" need not be transferred to and from the base unit. These phrases can be stored once in the memory of the base unit and can then be retrieved and played according to instructions that are transferred to and from the base unit. Instruction files are generally smaller in size than actual audio files so that they can be transferred to and from the base unit more quickly than actual audio files. Thus, the interactive apparatus according to embodiments of the invention can be readily updated.

The general audio sequences (GAS) can call various audio resources that may be stored as CA, SYN and RAW audio resources. Although any suitable labels may be used, SYN may be a short form for the word "synthesized" and may be used in conjunction with an on-chip synthesizer used for musical instruments, horn honk, animal sounds, etc. "SYN" files may be derived from musical instrumental digital interface (MIDI) type files. "RAW" may be raw, or uncompressed, audio sound files. They can be used when sounds of very high quality are desired. "CA" may stand for "compressed audio" files.

Each CA audio resource is a compressed binary file representing a word, phrase, or sound. Each SYN audio resource may be a set of commands representing instruments and notes. In some embodiments, the actual instrument sound files are not stored with the SYN audio resource, just the commands. This allows musical sets of commands to specify complex musical pieces with very high quality in very small space. The instrument sounds and notes are stored in a RAW audio resource file which may be an uncompressed binary file representing a sound. It may be used when high quality audio output is desired.

One or more input devices 92 can be included in the interactive apparatus. Examples of input devices include styluses, knobs, buttons, and levers. These may be in the edge region of the base unit. For example, the previously described selecting device can be an input device. Other input devices such as volume controls can also be in the base unit.

Any suitable transferable information storage medium 80 may be used in the interactive apparatus. For instance, the transferable information storage medium 80 may be a cartridge, a disk, a tape, or a memory stick. Data cartridges are especially desirable since they can be easily manipulated and handled by children. In some embodiments, the transferable information storage medium 80 comprises a flash memory cartridge.

The transferable information storage medium 80 can be used to provide new computer code to the interactive apparatus. Suitable computer code can include code that updates the interactive apparatus so that a new removable template can be used with the interactive apparatus. In addition, the code can also update the interactive apparatus so that other sheets can be used with the interactive apparatus. Thus, by using the transferable information storage medium 80, the interactive apparatus can be reprogrammed so that new removable templates and new sheets with different print elements printed on them can be used with the interactive apparatus. It can also be used to transfer audio or graphics data as well as instructions to play audio or graphics data to the interactive apparatus.

The transferable information storage medium 80 can also be used to retrieve computer code from the interactive apparatus so that it can be used elsewhere. For example, the user's performance information can be recorded in a user log file stored in the transferable information storage medium 80. The user's performance information can be logged to the user log file and the performance information can be uploaded to a server computer. Using the performance information and optionally a personal profile, the server computer can select content for the user. For example, the user may have an interactive apparatus with a removable template with the letters A–Z (e.g., the interactive apparatus shown in FIG. 2). In an interactive mode, the interactive apparatus may ask the user questions pertaining to letter recognition and spelling. Exemplary questions may be, for example, "Can you find the letter A?" and "Can you spell CAT?". The interactive apparatus may determine that the user is proficient in letter recognition, but that the user's spelling skills could be improved. This performance information can be recorded in the user log in the transferable information storage medium 80 and can be uploaded to a server computer. In response, the server computer can retrieve more spelling questions and fewer questions that pertain to letter recognition for the user. The interactive apparatus can thus adapt to the user's learning ability over time so that new and different challenges are presented to the user. Adaptive learning processes and systems are described in greater detail in U.S. patent application Ser. No. 09/632,424 filed Aug. 4, 2000, which is assigned to the same assignee as the present invention and which is herein incorporated by reference in its entirety for all purposes.

In some embodiments, a transferable information storage medium is not needed to transfer computer code to and from the base unit. For example, the base unit can have or be coupled to a transceiver (e.g., an RF transceiver) that can receive or send computer code to a computer that is separated from the base unit. In another example, the base unit can have a data port such as a USB (universal serial bus) port that allows a user to transfer data to and from the base unit through a physical connection. The physical connection may be a data cable coupled to a computer.

The interactive apparatus can be powered using batteries or a power cord. Preferably, the electronics in the base unit 12 are powered using batteries. In addition, the base unit 12 may automatically shut off when the interactive apparatus has not been used for a predetermined period of time (e.g., 1 or 3 minutes or more). By doing so, battery power can be conserved if the user forgets to turn off the interactive apparatus. Children are particularly likely to forget to turn off electronic toys after they are finished using them.

An example of how the interactive apparatus can operate can be described with reference to FIG. 4. A user can press a movable element in a removable template that is over a major surface a base unit. The pressure applied by the user to the movable element is transferred to the major surface and to an electrical element such as a pressure-sensitive switch. The pressure-sensitive switch is underneath the movable element and the major surface, and is also in an array of electrical elements 88. Then, the processor 86 determines which electrical element in the array of electrical elements 88 was activated. After determining which electrical element was activated, the processor 86 retrieves speech data that corresponds to the activated electrical element from memory 90. The retrieved speech data relates to the movable element depressed by the user. For example, the movable element may be a button that is shaped as a square and is colored red. The speech data that is retrieved for that movable element can be a phrase such as "red square". After determining what sounds to provide to the user, the processor 86 causes the speech synthesizer 82 and the audio output device 84 to produce speech using the retrieved speech data.

Figure 5:
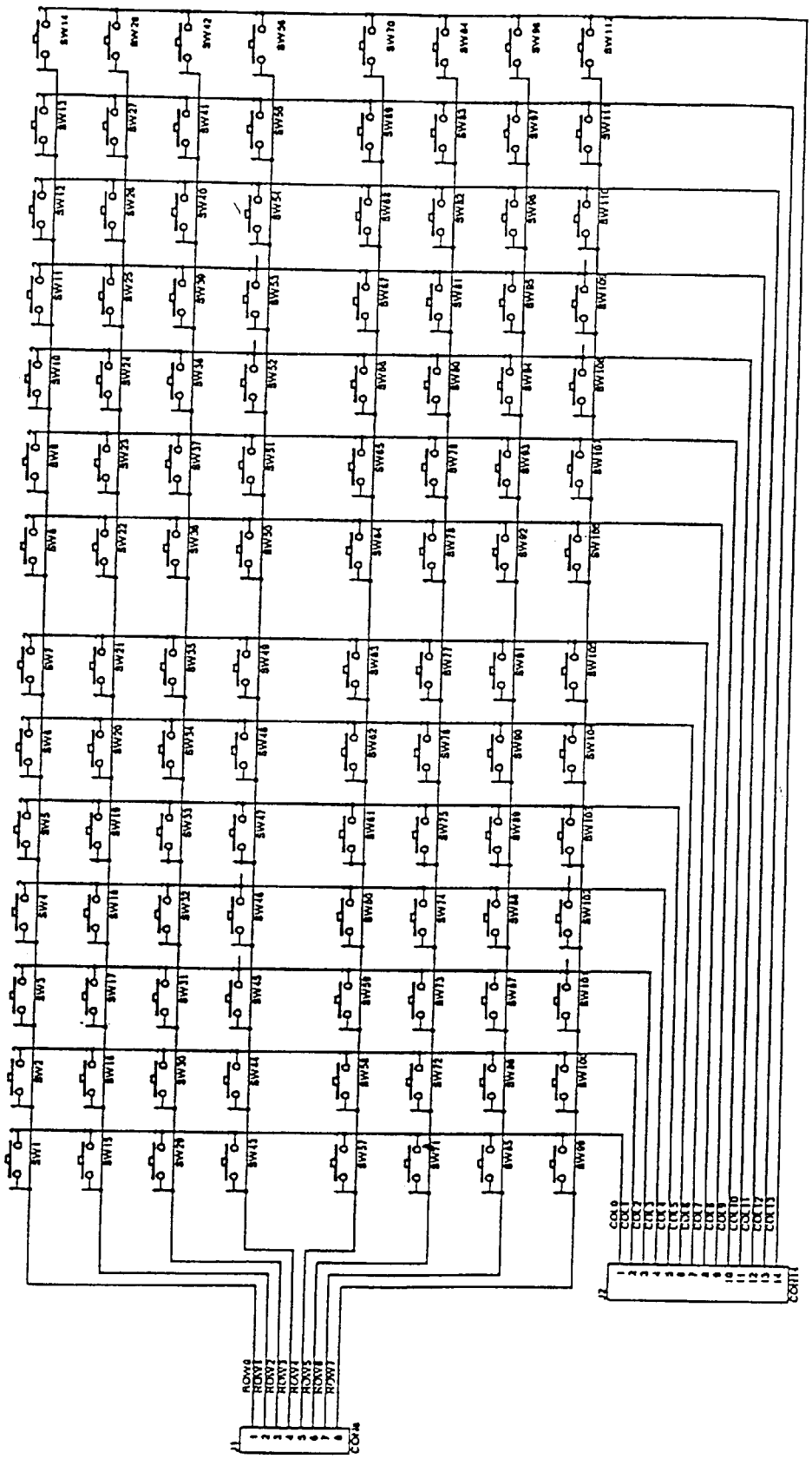
FIG. 5 shows an electrical schematic diagram of an array of switches.

As noted, the array of electrical elements 88 can be located underneath the major surface of the base unit. The electrical elements in the array can be arranged in a regular or an irregular manner. For example, the electrical elements may be arranged in a plurality of rows and columns in the array. Each electrical element can correspond to a particular row and a particular column in the array of electrical elements 88. An exemplary schematic electrical diagram of an array of electrical switches is shown in FIG. 5. In the diagram, there are 8 rows and 14 columns for a total of 112 switches that are labeled 1 through 112. Each switch can correspond to a particular row and a particular column.

In an array of electrical elements, a portion of the electrical elements in the array may be provided to interact with movable elements in one template, while other electrical elements in the array may be provided to interact with movable elements in another template. For example, referring to FIG. 5, a first removable template may be designed to activate switches 47, 60, and 69 and provide outputs that are related to features on the first removable template. A second removable template can be designed to activate switches 71, 74, and 80 and provide outputs that are related to features on the second removable template. By designating certain switches within an array to be used with certain removable templates, the electrical elements in the array of electrical elements need not be reassigned to retrieve different output for each removable template that is used with the base unit.

In some embodiments, one or more electrical elements in the array of electrical elements 88 can be assigned to identify the particular template (or a particular sheet with one or more distinct print elements) being used by the user. A movable element can be provided in each of the removable templates to activate a certain electrical element. The electrical element can be pre-assigned to inform the base unit that a different removable template is on the base unit. After being activated, certain electrical elements in the array of electrical elements 88 can be re-assigned to retrieve outputs that correspond to the new removable template that is on the base unit.

Illustratively, again referring to FIG. 5, a first removable template (not shown) is placed over the array of switches. A "Go" button (or other indicator) in the upper right hand corner can be depressed to activate the switch 14. A synthesized voice from a speaker in the base unit can prompt the user to press the "Go" button. By activating the switch 14, the processor determines that the first removable template is currently on the base unit. Switches 85, 87, and 89 can be assigned to retrieve outputs that are specific to the first removable template when they are activated by other movable elements in the first removable template. After interacting with the first removable template, a second removable template can be placed over the array of switches. The second removable template can have a "Go" button at the lower right hand corner. The "Go" button in the second removable template can be disposed over switch 112. Other movable elements in the second removable template can be disposed over switches 85, 87, and 89. After depressing the "Go" button in the second removable template, the switch 112 is activated and the processor determines that second removable template is on the base unit. The processor subsequently re-assigns switches 85, 87, and 89 so that when they are activated, outputs that relate to the second removable template are retrieved instead of outputs that relate to the first removable template.

Alternatively or additionally, the base unit can automatically determine which removable template is currently being used without any prompt from the user. For example, in some embodiments, each removable template can have a protruding portion that extends downward from the bottom surface of the removable template or protruding from sides of the template. For each of the removable templates, the protruding portions may be at different respective locations so that different pressure-sensitive switches (e.g., to the sides or under the template) are activated when different removable templates are on the base unit. A processor in the base unit can determine which removable template is currently on the base unit from the particular switch that is activated by the removable template. In another example, the removable templates may have electrical contacts at respectively different positions at their bottom edges. Corresponding electrical contacts can be located at the upper edges of the major surface of the base unit. When a removable template is on the base unit, the bottom edge of the removable element is in contact with the upper edge of the major surface. Electrical contact is made between a specific set of electrical contacts on the bottom edge of the removable template and the upper edge of the major surface. The processor in the base unit can then determine which contact at the edge of the major surface is activated. From this information, the processor can determine which removable template is presently on the base unit.

As noted, the electrical elements can be pressure-sensitive switches. In some embodiments, each switch may have an upper conductive region and a lower conductive region that are not in contact with each other in the absence of applied pressure. The upper conductive region may be in a specific row while the lower conductive region may in a specific column (or vice versa). When pressure is applied to the upper conductive region, the upper conductive region contacts the lower conductive region closing a circuit and activating the switch. The processor determines the row and the column of the depressed switch. It can then retrieve output that was assigned to the activated switch from memory. This output can then be presented to the user.

Figure 6:
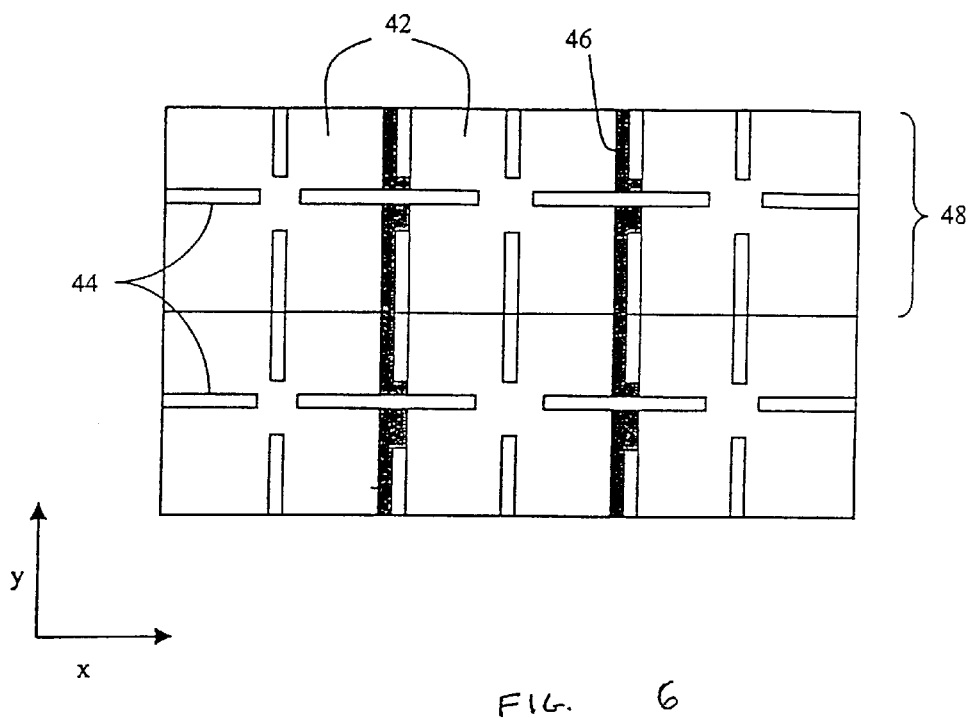
FIG. 6 shows a top view of a lower portion of a group of switches in an array of switches.

FIG. 6 shows a plan view of a portion of an array of switches according to an embodiment of the invention. Lower conductive regions 42(a), 42(b) correspond to columns in an array of switches. The lower conductive regions 42(a), 42(b) can be, for example, a conductive ink that is printed on an insulating substrate. The columns of lower conductive regions 42(a), 42(b) are electrically isolated from each other by insulating regions 46. A number of insulating spacers 44 are on the lower conductive regions 42(a), 42(b).

The insulating spacers 44 space the lower conductive regions 42(a), 42(b) of the switches from their corresponding upper conductive regions (not shown). The upper conductive regions are separated from the lower conductive regions 42(a), 42(b) by an air gap. In the absence of applied pressure, the air gap separates the upper and lower conductive regions in switch so that the switch is open.

Figure 7:
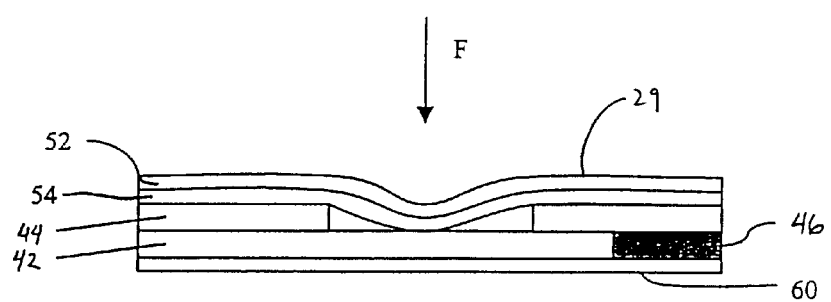
FIG. 7 shows a cross-sectional view of a portion of a switch as pressure is applied to the switch.

When pressure is applied to the switch, an upper conductive region contacts the lower conductive region of the switch thus forming a closed circuit. Referring to FIG. 7, pressure can be applied to a major surface 29 of the base unit. The user can apply pressure to the major surface 29 by using, for example, a finger, a stylus, or a movable element in a removable template. Styluses can include marking or non-marking instruments. Marking instruments include crayons, pens, markers, and pencils. Additional details regarding embodiments that use marking instruments are in U.S. patent application Ser. No. 09/886,401, entitled "Interactive Apparatus Using Print Media", filed on the same day as this application. This patent application is assigned to the same assignee as the present application and is herein incorporated by reference in its entirety for all purposes.

The movable element includes an upper portion that the user contacts and a lower portion that contacts the major surface 29 of the base unit. The major surface 29 can be on an upper insulating layer 52 that has an upper conductive region 54 printed on it. The upper insulating layer 52 can be made of, for example, Mylar™ or any other suitable flexible insulating material. Insulating spacers 44 keep the upper conductive region 54 and a lower conductive region 42 on a lower insulating layer 60 from contacting each other. However, when pressure is applied to the major surface 29, the upper insulating layer 52 and the upper conductive region 54 deform. The upper conductive region 54 and the lower conductive region 42 then contact each other, thus activating the switch. The conductive material making up the conductive regions may be solid or patterned. Patterning the conductive material saves cost as less conductive material is needed to produce the interactive apparatus.

The maximum lateral spacing of adjacent insulating spacers 44 that separate the upper and lower conductive regions of a switch may be adjusted so that a user's palm does not activate the switch while permitting a user's finger or a stylus to activate switch. For example, in some embodiments, the maximum lateral spacing between adjacent insulating spacers 44 can be about 0.125 inches to about 0.5 inches (or less). By doing so, the user can rest the user's palm on the major surface of the base unit, without inadvertently activating the switches underneath the major surface.

In some embodiments of the invention, the removable templates can be adapted to secure a sheet to the base unit and align the sheet with the major surface of the base unit. Any suitable sheet can be used with the interactive apparatus. The sheet can be it colored or uncolored, and can include any suitable number or types of print elements. Exemplary print elements include drawings, pictures (e.g., photographs), symbols, maps, letters, numbers, etc. The user can interact with a print element on the sheet and the interactive apparatus can provide an output in response to this interaction. Examples of interactions include marking on, or depressing the print elements. Illustratively, the print elements may be, for example, letters or characters that can be colored by the user. Outputs that relate to the letters or characters being colored can be presented to the user. The print elements may also be selected by a user without marking on the sheet. For example, a sheet can be disposed on the base unit and the user can select a picture, word, or letter printed on the sheet without marking on the sheet. Output that relates to the selected picture, word, or letter can then be presented to the user.

The locations at which contact is made between upper conductive region 54 and lower conductive region 42 may correspond to a pattern marked or noted on an interactive activity sheet or template that is placed on major surface 29. In the interactive apparatus embodiments, a set of paired conductive regions 42 and 54, may be included in a pattern that denotes the outlines of a block letter "A". There may be, for example, 10 pairs of contact points underlying the outlines of a block letter "A" on an activity sheet. When a crayon is used to color in the letter "A" on the activity sheet, the set of 10 contact pairs are repeatedly, sequentially, activated, and the interactive apparatus responds with an audio signal. For example, the audio may say, "That's the letter A. It says "aeh" or "aaeee" as in apple or April" The interactive apparatus may continue to play other audio as long as the letter "A" is being colored in. For example, it may go on to play the song "April Showers" or say the poem, "An apple a day keeps the doctor away". If a child is coloring in the block letter "A", the coloring activity may not be completely continuous. The child may stop for a few seconds, holding the crayon off the sheet. When the child begins to start coloring again, it is not necessarily desirable to have the audio begin from the beginning, particularly if the child's pause in activity was only for a couple of seconds. Because traditional "debounce" techniques are symmetric, use of a traditional debounce technique would delay the onset of signal acknowledgement when the child started to color as well as delaying the restart of signal after a pause. (A traditional debounce technique would count to a pre-set number of repeat contacts before acknowledging a signal as bonefide, e.g. not spurious, and wait for the same pre-set number of contacts in a row to be missed before acknowledging that the signal was terminated.) It would not be desirable to have a delay in the onset of audio when the child began to draw, so known debounce techniques were not useful to cure the problem of the audio starting over each time the child paused for a few seconds. Consequently the present interactive apparatus was designed to benefit from an inventive asymmetric debounce technique. The initiation of contact within a set of contacts is termed a "down transition" and the cessation of contact within a set of contacts is termed an "up transition". In the inventive asymmetric debounce technique, for a given sampling rate for electrical signal activity, the down transition requires only a single time sample of the contact set to show an electrical signal, to acknowledge a signal as bonefide (or "good"). In contrast, the up transition requires 39 time samples in a row to be missed, that is to occur with out an electrical signal being detected, to acknowledge a cessation in activity. If an electrical signal is detected any time before the $39^{th}$ time sample, the audio resumes as if there had been no interruption at all (the values 1 and 39 were selected for purposes of illustration; the asymmetric debounce technique generally only desirably uses values that are very different and therefore any suitable values may be used). Thus, unwarranted jumps to the beginning of the audio are avoided. Accordingly, in embodiments of the invention, if the user does not interact with a sheet within a predetermined of time, the audio may start over, and may not continue from the prior audio played to the user.

The removable templates that are adapted to secure sheets to the base unit may have movable elements in them. The movable elements can be the same or different than the movable elements that are described above. Output can be provided when the user applies pressure to the sheet or when the user moves a movable element in the removable template. The user has at least two different ways of interacting with the interactive apparatus even though a single removable template is on the base unit.

The interactive apparatus in these embodiments provides appropriate output in response to coloring or marking on a sheet. This enhances the user's creativity, self-expression, and imagination. An action other than simply pressing a button can produce output that is educational, rewarding, entertaining, and/or informative to the user. The user is engaged in an entertaining and fun activity while the interactive apparatus reinforces or teaches educational concepts to the user.

Figure 8:
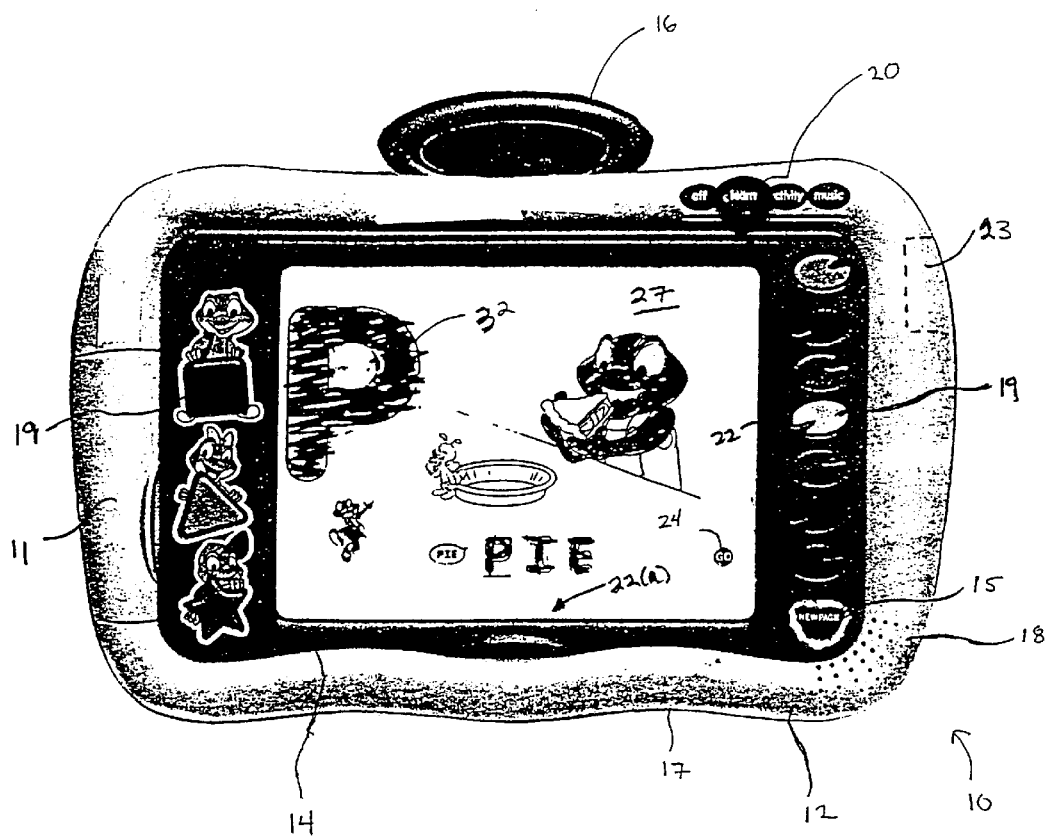
FIG. 8 shows an interactive apparatus according to yet another embodiment of the invention. The removable template in this embodiment has a window that exposes a sheet with print elements.

An interactive apparatus comprising a removable template that can secure a sheet to the base unit is shown in FIG. 8. The removable template 14 includes a hinge that joins a first portion 22 and a second portion (not shown). Both the first and the second portions may be in the form of frames. They can also be substantially planar. The second portion is underneath the first portion 22. The second portion may have a window (or a flexible membrane) of about the same size as the window in the first portion so that pressure can be applied through it and to the major surface under the removable template 14. Together, the first portion and the second portion form a clamshell.

The first portion 22 has a frame that defines a window. A user can lift the first portion 22 by grasping a raised portion 22(a) formed in the first portion 22. Lifting the first portion causes an actuator (not shown) at the bottom of the removable template 14 to apply pressure to an electrical element (e.g., a switch) underneath the removable template 14. A voice from the speaker 18 can then say "Put in a new coloring page". At this point, some of the electrical elements can be locked out (i.e., non-responsive) until a sheet is loaded and the user presses an indicator (e.g., a green "Go" circle) that informs that base unit as to the particular sheet that is on it. The user can then place a sheet 27 between the first and the second portions. The user then closes the removable template by bringing the first portion 22 next to the second portion. The sheet 27 can then be viewed through the window in the first portion 22. A voice from the speaker 18 may then say "Let's color while we learn our ABCs".

The user may depress the "Go" circle 24 (or other identifier) printed on the sheet 27 to inform the base unit that the sheet 27 is on it. A voice from the speaker may prompt the user with the phrase "touch the Go circle on your coloring page!" The user can then depress the "Go" circle with a crayon or finger. Depressing the "Go" circle causes an electrical element under the major surface to activate. Activating the electrical element under the "Go" circle informs the base unit that the particular sheet 27 shown in FIG. 8 is on the base unit 12. If the user presses the wrong section of the sheet 27 and activates an electrical element designated for another sheet or removable template, the user can depress the "new page" button 15. After depressing this button, the interactive apparatus can reset itself and can prompt the user to "Press the green Go circle" to continue.

The sheet 27 in this example includes a number of print elements. The print elements on the sheet 27 shown in FIG. 8 include a large letter P, the word PIE, and a drawing of a frog eating a piece of pie. The user can color any of these print elements with crayons or markers. As the user colors a print element, pressure is applied to the sheet 27 and also to the major surface that is underneath the sheet 27. The applied pressure activates one or more electrical elements (not shown) underneath the print element being colored. After the one or more electrical elements are activated, audio corresponding to the print element being colored by the user can be provided to the user through the speaker 12. For example, as the user is coloring the word "PIE", a synthesized voice coming from the speaker can say "pie, pie is spelled P-I-E". In another example, if the user colors the picture of the frog eating the piece of pie, the audio provided to the user may be the sound of the character shown in the drawing eating a piece of pie.

The sheets can be used in the interactive apparatus while the apparatus is in different operational modes. In one operational mode, the interactive apparatus may quiz the user. For example, the interactive apparatus may ask the user where the letter P is. In response, the user can begin coloring the letter P and the interactive apparatus may produce rewarding sounds such as "that's right!" in response to the user's selection. In another operational mode, the user can apply pressure to different print elements and different songs are presented to the user. For example, the user can color a picture of an ant and the letter A. In response to the coloring, the interactive apparatus can play respectively different songs when the different print elements are colored. This entertains the user and keeps the user engaged with the interactive apparatus.

An exemplary script table that can be associated with the sheet 27 is shown in FIG. 11. As shown in FIG. 11, different audio outputs can be provided in response to the user's selection of different print elements. In FIG. 11, "dt" means "down touch" onto, e.g., a print element and "drag" means that the user is dragging an instrument across, e.g., a print element. "sfx" stands for "sound effects".

After the user is finished interacting with the sheet 27, the sheet 27 can be replaced with a sheet having different print elements. For example, the sheet 27 shown in FIG. 8 may be replaced with a sheet that shows a large letter "A" and a picture of an ant. The user may inform the base unit, or the base unit may be automatically informed, that a different sheet is on the base unit. A processor in the base unit can then assign the electrical elements so that outputs that are specific to the print elements on the new sheet are produced. For example, the user can color a picture of an ant on the new sheet and a synthesized voice coming from the speaker can say "ant is spelled A-N-T".

The removable template 14 shown in FIG. 8 has movable elements 19. Each of the movable elements 19 is in the frame of the second portion and extends through apertures in the frame of the first portion. Each of the movable elements 19 is a button that can be pressed by the user. In the illustrated example, the movable elements 19 on the left side of the removable template 14 are shaped as a square, triangle, and star. The movable elements 19 can also be colored with bright colors such as green, red, and yellow. The movable elements 19 on the right side can also have different colors and can be in the form of lilypads. When a user presses one of the movable elements 19, a synthesized voice coming from the speaker 18 can recite the name and the color of the shape of the movable element 19 pressed by the user.

Figure 9A:
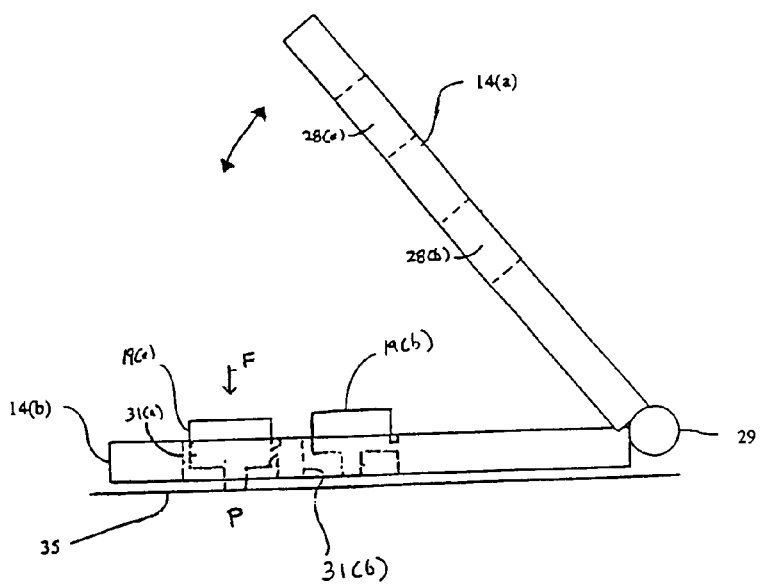
FIG. 9(a) is a side view of a removable template.

Some aspects of a removable template of the type shown in FIG. 8 can be described with reference to FIGS. 9(a) and 9(b). FIG. 9(a) shows a removable template with a first portion 14(a) and a second portion 14(b) secured together by a hinge 29. In some embodiments, the hinge may be a "breakable" hinge that can be easily put back together by snapping hinge portions together. In a typical breakable hinge, a round protrusion on a first template portion can cooperatively fit in a recess in a second template portion to snap-fit the two portions together. Children, for example, can easily break frame-type templates at the hinge. Accordingly, a breakable, yet replaceable hinge can allow them to "break" the hinge, and a parent can put the template back together again so that it can be reused.

The first portion 14(a) includes a number of apertures 28(a), 28(b) that receive the upper portions of the movable elements 19(a), 19(b) in the second portion 14(b) of the removable template 14. In some embodiments, the apertures 28(a), 28(b) can be cooperatively structured with the movable elements 19(a), 19(b). For example, each of the movable elements 19(a), 19(b) could be shaped as a circle, triangle, or square. The apertures 28(a), 28(b) in which they are disposed can be shaped as a slightly larger circle, triangle or square. When the removable template is in a closed position, the upper portions of the movable elements 19(a), 19(b) are within and are accessible to the apertures 28(a), 28(b) of the first portion 14(a). Accordingly, the movable elements 19(a), 19(b) can be pressed by a user when the removable template 14 is in a closed position.

When the user presses a movable element 19(a), the movable element 19(a) can move downward. A lower portion of the movable element 19(a) can then contact a major surface 35 of the base unit (not shown). As shown, the lower portion can have a narrower width than the upper portion of the movable element 19(a). An electrical element P lies underneath the major surface 35. When a force F is applied to the movable element 19(a), force is also applied to the major surface 35 of the base unit. Subsequently, the movable element 19(a) and the electrical element P interact with each other. For example, the electrical element P may be a pressure sensitive switch that activates when it is depressed. The lower portion of the other movable element 19(b) that is not depressed does not contact the major surface 35 of the base unit 12. Thus, the electrical elements underneath the major surface 35 of the base unit can be selectively activated by the application of pressure to the major surface 35 by the user. A processor in the base unit can determine which electrical elements have been activated and can retrieve appropriate output for the movable element that was moved by the user.

Figure 9B:
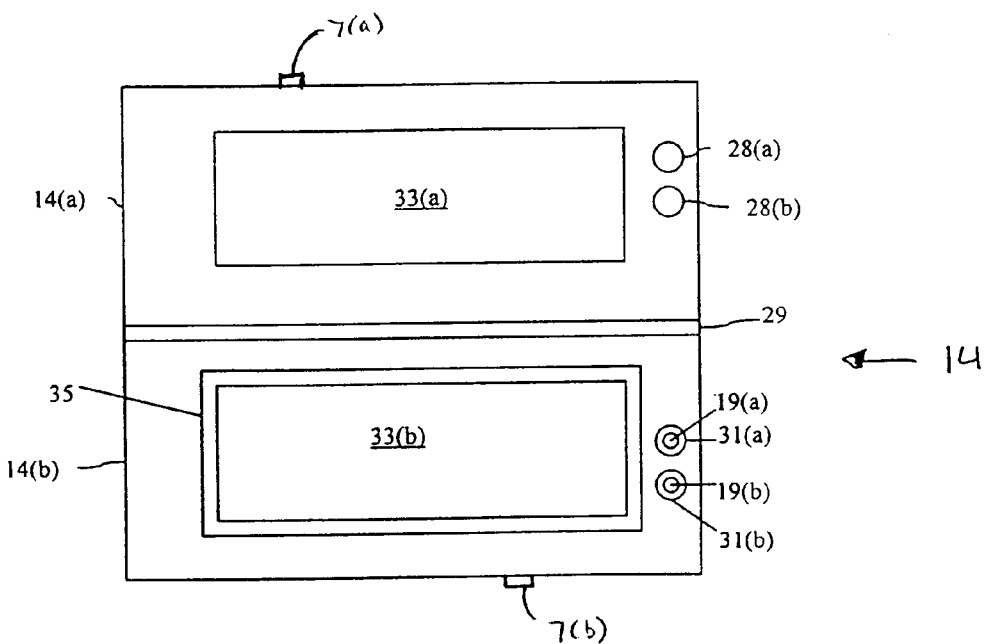
FIG. 9(b) is a top view of the removable template shown in FIG. 9(a) in an open position.

FIG. 9(b) shows the removable template shown in FIG. 9(a) in an open position. In this Figure, the windows 33(a), 33(b) formed by the frame-like first and second portions 14(a), 14(b) of the removable template 14 are shown. Two protruding portions 7(a), 7(b) extend from the first and second portions 14(a), 14(b). When the template 14 is in an open position, the protruding portion 7(b) can activate a pressure sensitive switch (not shown) on the inner edges of the edge region (not shown) of the base unit so that the base unit knows that the frame-type template 14 is on the base unit and is in an open position. The template 14 can then be closed and the other protruding portion 7(a) can activate another switch on the same inner edge of the edge region to indicate that the template is closed. Thus, in embodiments of the invention, the base unit can automatically determine that a frame-type template is on the base unit and can also determine if the template is in an open or a closed position.

In addition, a shallow well 35 can be formed in the second portion 14(b). The outer edges of the shallow well 35 may be slightly larger than the size of a standard sheet of paper (e.g., about 8×11 inches) so that a piece paper (not shown) can rest in the well 35 and is properly aligned in the removable template 14. When removable template 14 is in a closed position, the sheet that is between the first and the second portions 14(a), 14(b) can be viewed through the window 33(a) in the first portion 14(a). To further secure the sheet to its proper position in the removable template 14, a gasket (not shown) can be present on the inner surface of the first portion 14(a), just outside the edge defining the window 33(a). The gasket can be made of an elastomeric material and can secure the sheet in the well 35 so that the sheet does not move. As noted above, proper positioning of the sheet is desirable so that any print elements on the sheet are properly aligned with the electrical elements underneath the major surface of the base unit.

Figure 9C:
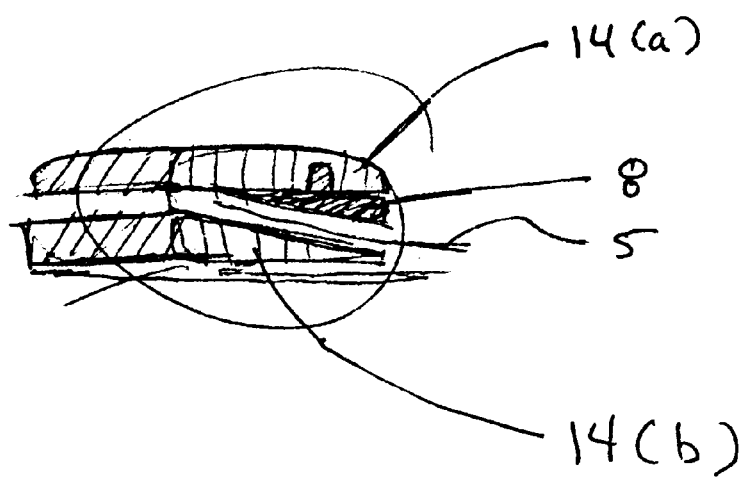
FIG. 9(c) shows a portion of a removable template with a gasket.
Figure 1:
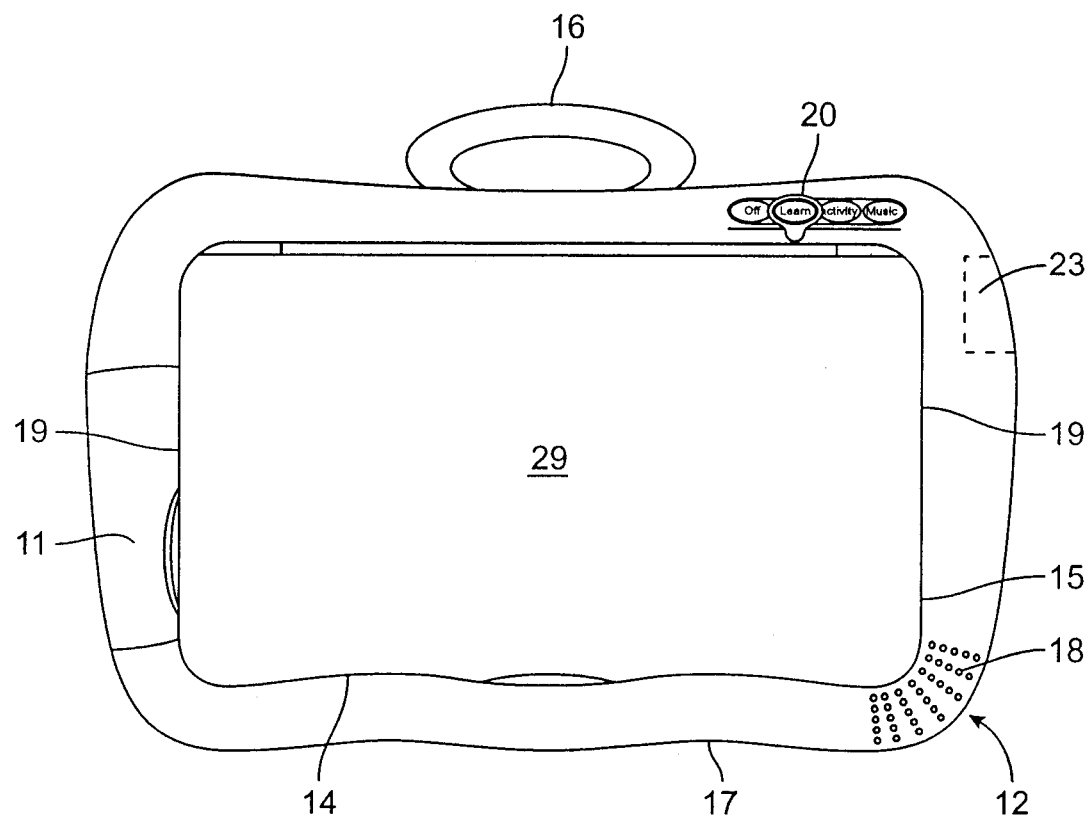
Figure 2:
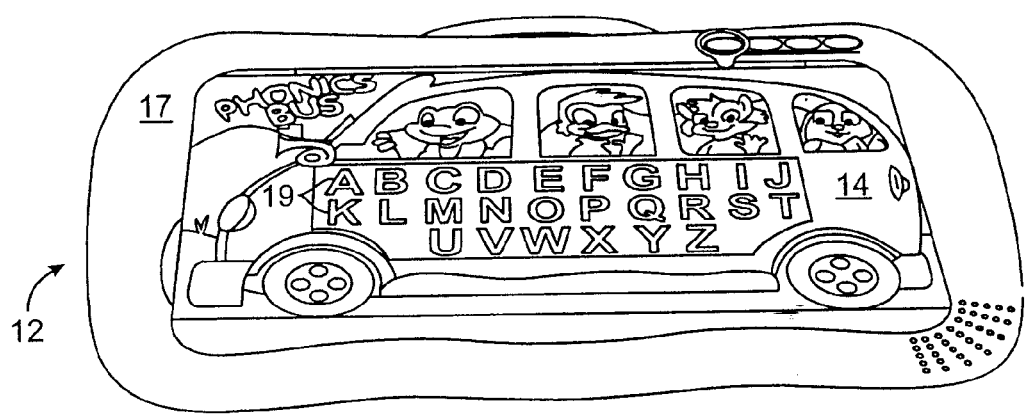
Figure 3:
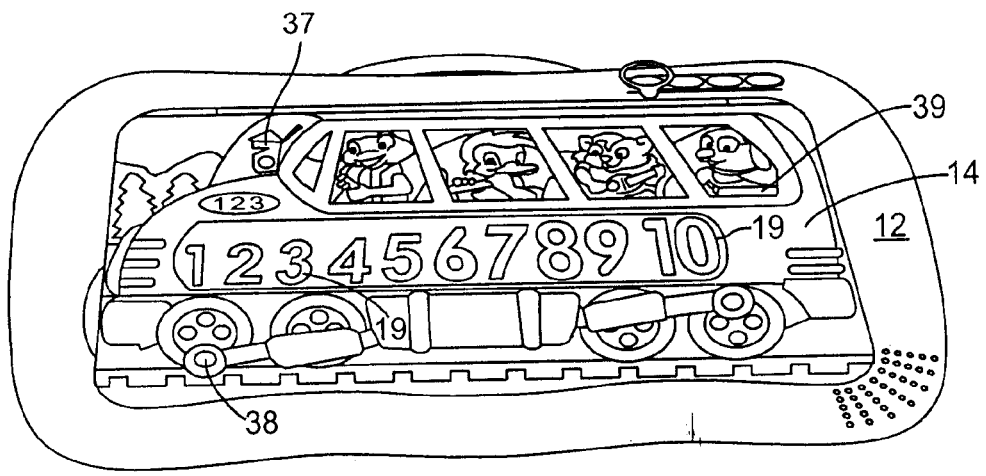
Figure 4:
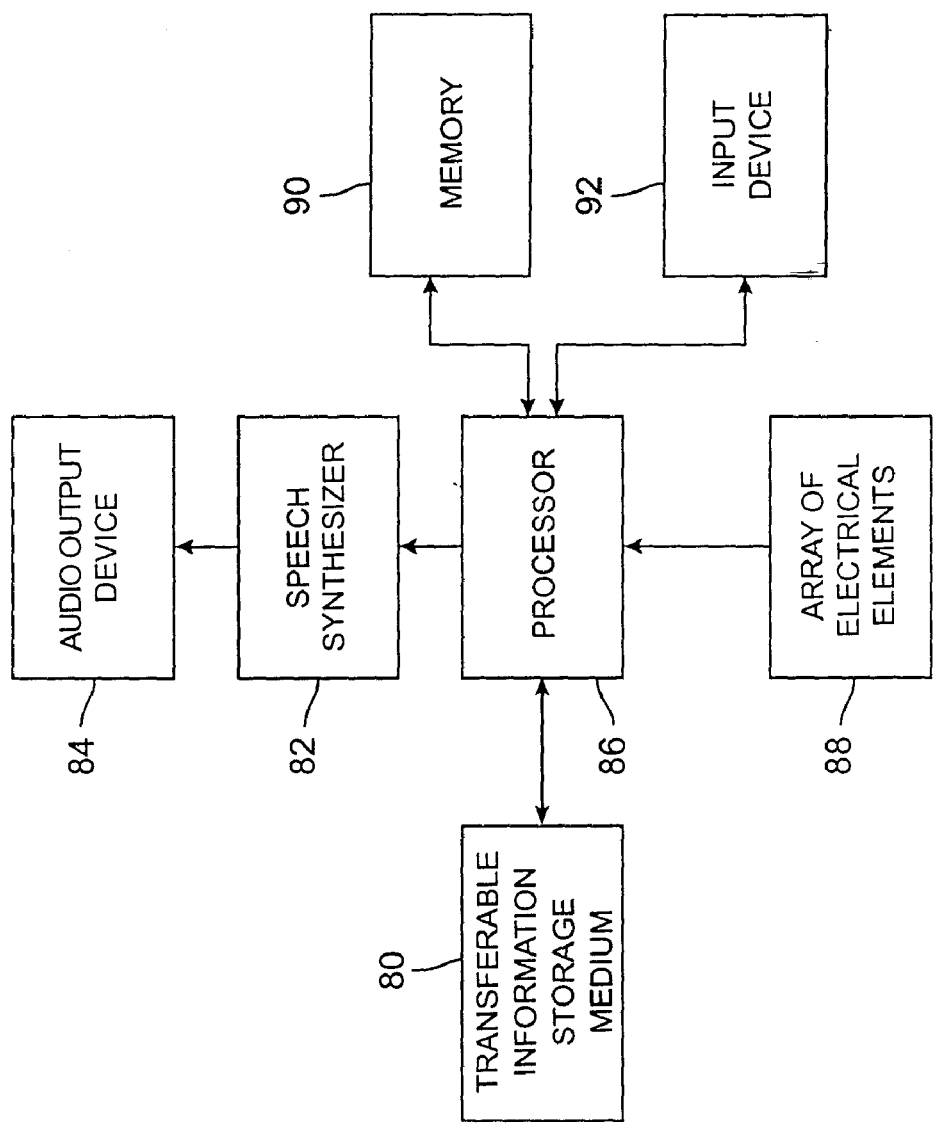
Figure 5:
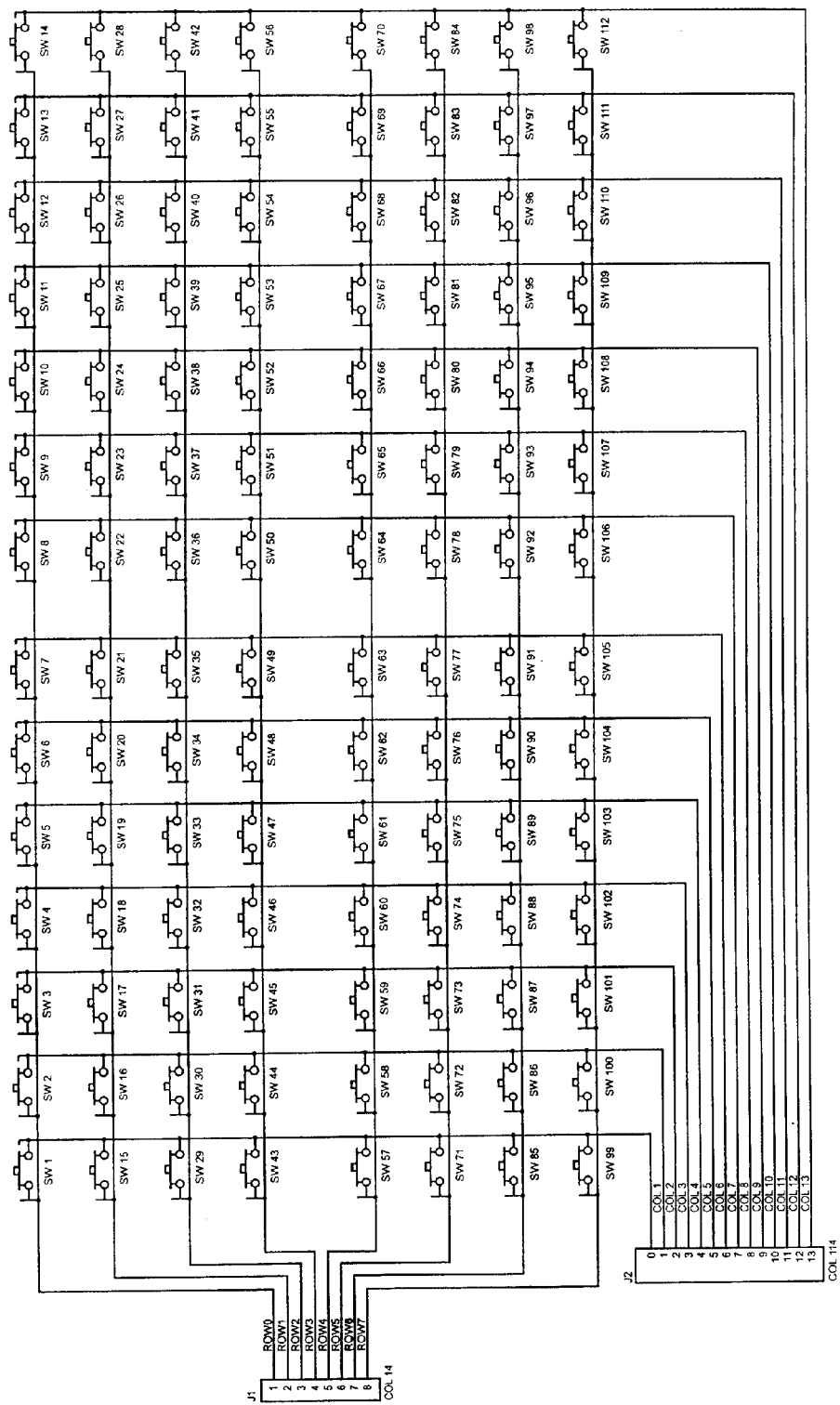
Figure 6:
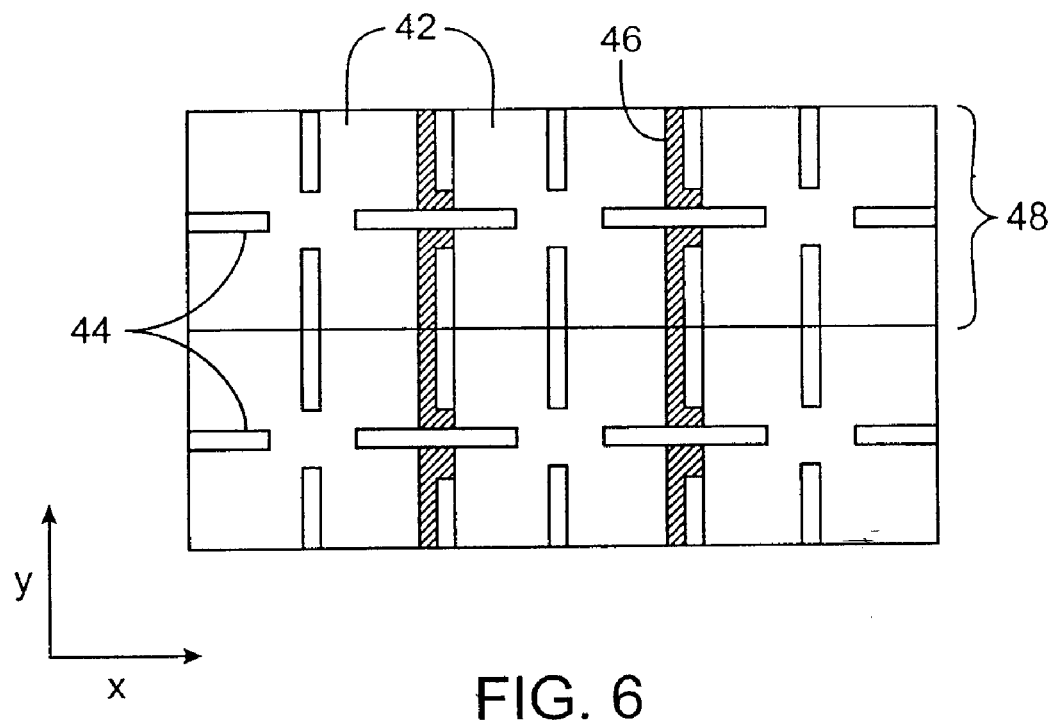
Figure 7:
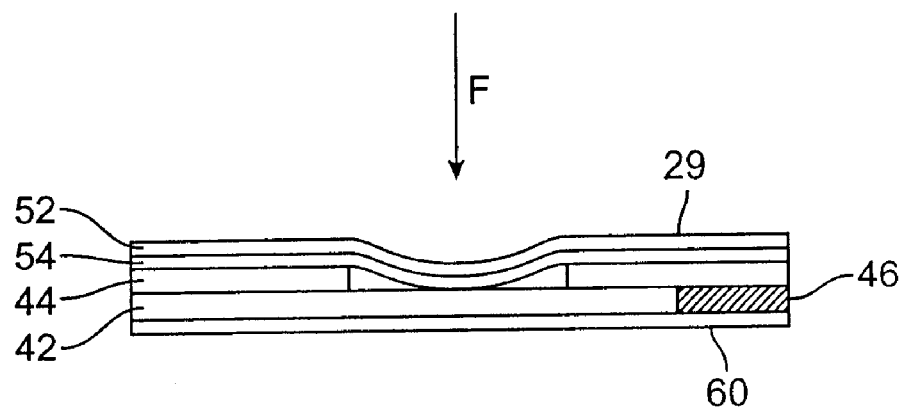
Figure 8:
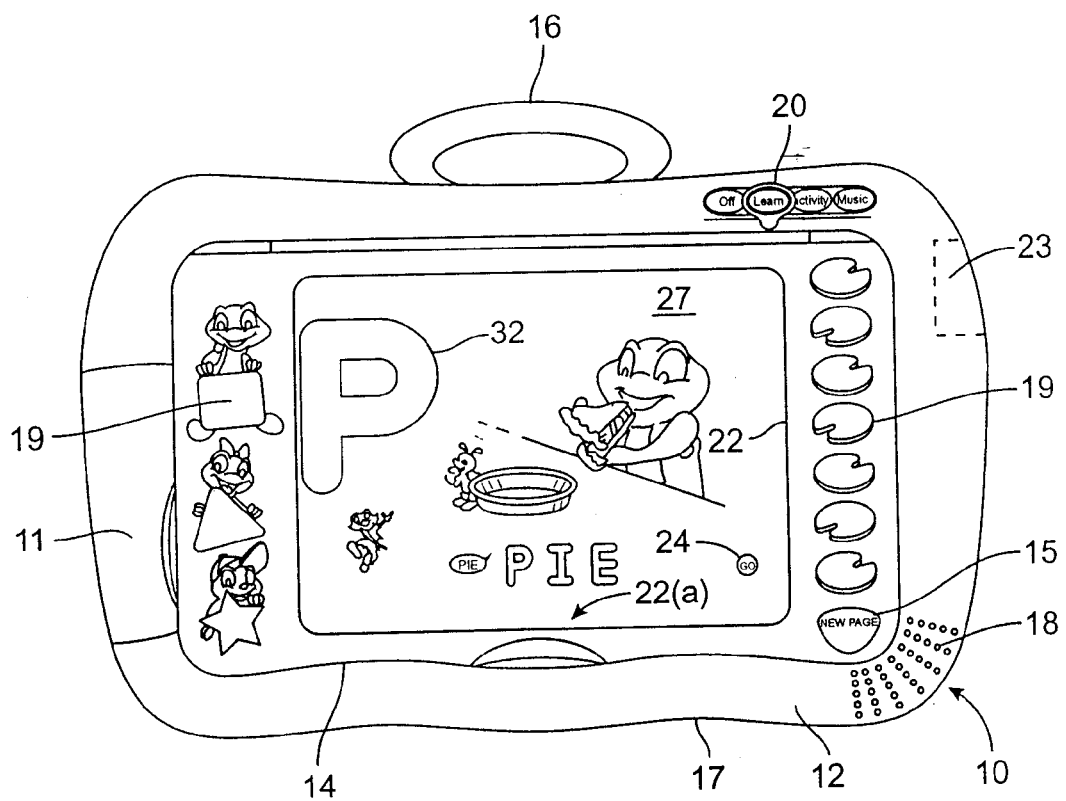
Figure 9A:
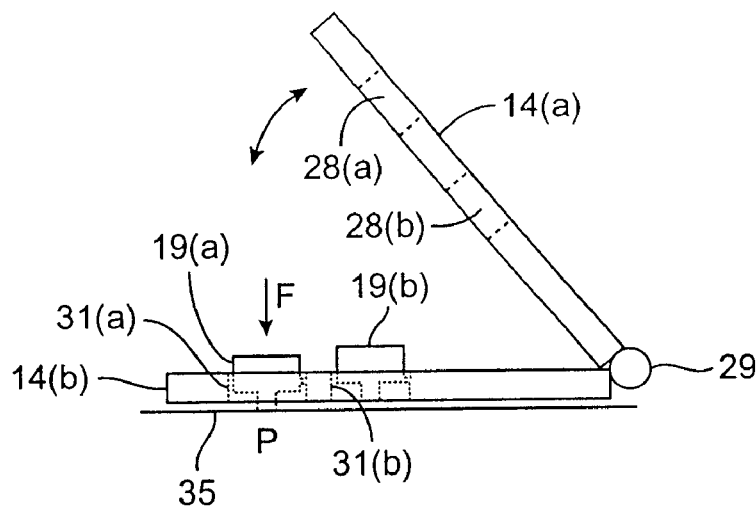
Figure 9B:
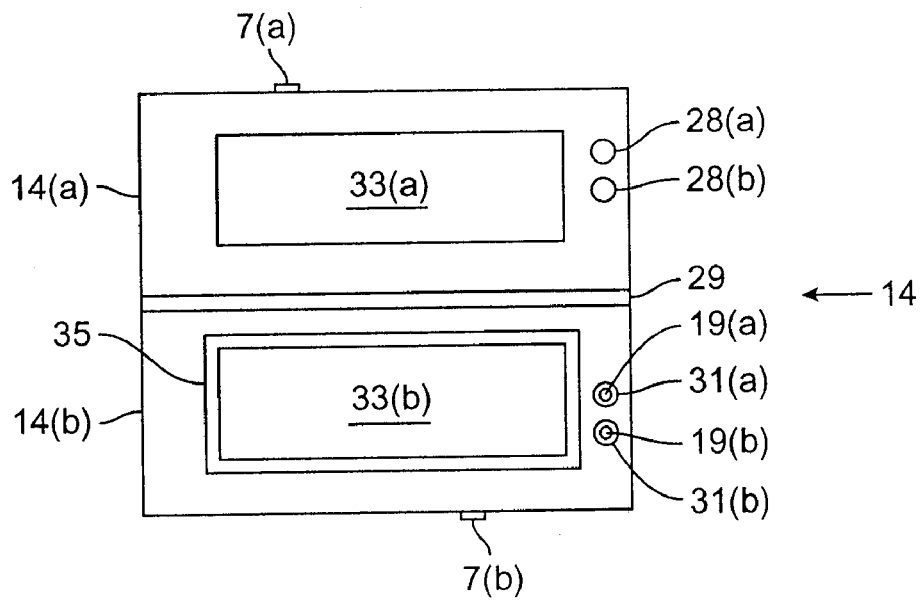
Figure 9C:
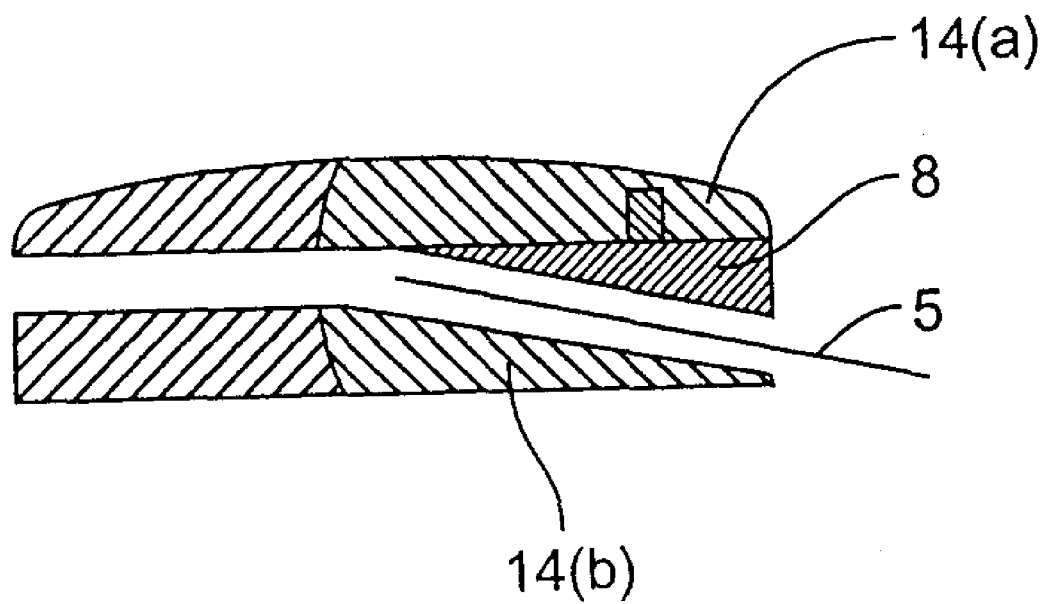

FIG. 9(c) shows a portion of a frame-type template with a gasket. FIG. 9(c) shows a first template portion 14(a) and a second template portion 14(b). A gasket 8 can be placed on the first template portion 14(a) so that it is secured to it. In this example, the inner surface of the first template portion 14(a) is flat, while the inner surface of the second template portion 14(b) is angled with respect to the inner surface of the first template portion 14(*a*). The gasket 8 can also have a surface that is angled with respect to its opposite surface. The angled surface of the gasket 8 and the second template portion 14(*b*) can secure a sheet 5 against the upper surface of the base unit (not shown). Because the sheet 5 gradually descends towards the upper surface of the base unit, the user is less likely to "puncture" the sheet 5 near the edges of the sheet 5 and near the first and second template portions 14(*a*), 14(*b*).

The removable templates that secure sheets to the base unit may have additional or different features than those described above. For example, the removable template embodiment shown in FIGS. 9(*a*) and 9(*b*) has a clamshell-type design. In other embodiments, the removable template can be a one-piece template that secures a sheet with print elements to the base unit. For example, the removable template can consist of the second portion 14(*a*) without the first portion 14(*a*). Also, instead of the well 35, parallel guide rails could be formed at opposite sides of the frame-like first portion 14(*a*) or the second portion 14(*b*). A user could insert a sheet of paper in the guide rails so that the paper is guided to its proper position in the removable template. In yet other embodiments, the window 33(*b*) in the second portion 14(*a*) could be replaced with a flexible membrane.

In some embodiments, computer code that can be used in the interactive apparatus can be sent (e.g., downloaded) to the user from a remote server computer. The code may be for different outputs for different removable templates or sheets (or instructions to play the outputs). For example, the code may be for audio or video outputs that are produced by the interactive apparatus. Code for producing sheets with different print elements can also be sent to the user. The sheets can be printed at the user's site using a printer. After the sheets are printed, they can then be used with the interactive apparatus.

A system according to an embodiment of the invention can be described with reference to FIG. 10. The system includes a host site 109 and a user site 120. The user site 120 may be, for example, a home, school, or workplace. The host site 109 and the user site 120 are coupled through a communication medium 107.

The host site 109 may include a server computer 105 operated by a host company. In this example, the host site 109 has a server computer 105 that can access a content database 103 and a personal profile database 101.

The server computer 105 is typically a powerful computer or cluster of computers. For example, the server computer can be a large mainframe, a minicomputer cluster, or a group of servers functioning as a unit. In one example, the server computer may be a database server coupled to a Web server. The server computer can behave as a single computer that services the requests of one or more client computers. For example, one or more client computers 109 at different user sites can communicate with the server computer through the communication medium 107 and optionally through one or more Internet Service Providers (ISPs) (not shown). The client computers typically have less memory and less computing power than the server computer 105. Typically, the server computer 105 is remotely located with respect to the client computers 109.

The server computer 105 can have computer code for performing any suitable function. For example, the server computer 105 can have code for updating a user profile in a user profile database, retrieving data from any suitable database, and sending data to any person. Computer code may also be provided for selecting content for a content package, assembling the content package, and sending the content package to the user. The content package may include code for audio outputs, code for graphic outputs, code for instructions to play audio or graphics code, code for printing sheets with print elements, code for personalized information, etc.

The server computer 105 and the client computers communicate through a communication medium such as the Internet, and more particularly the World Wide Web (WWW). Typical communication protocols that can be used by the server computer 105, the client computer may include HTTP (hypertext transfer protocol), TCP/IP (terminal communication protocol /Internet protocol), or other protocol.

The server computer 105 may have data representing a Web site. The Web site may any suitable number of Web pages and is preferably entertaining to users under 18 years of age. On the Web site, the user (or other person such as the user's parents) can, for example, create a user profile, set operational preferences, play games, and select content for a content package.

The personal profile database 101 may include the user's personal preferences and information about the user. The user profile information may include basic information about the user. Such basic information includes the user's age, hobbies, address, phone number, e-mail address, school, relatives, teachers, parents, phone number, etc. The user profile information may also include information regarding the user's preferences. User preferences may include preferences such as favorite subjects, relatives, teachers, favorite songs, favorite sports, favorite foods, and favorite cartoons.

Information in the personal profile database 101 can be downloaded to the user site 120 and then transferred to the interactive apparatus 113. By doing so, the user's experience can be personalized. For example, the user's profile may indicate that the user likes sports. Math problems or sentences that relate to sports can be selected for the user and can be downloaded by the user for use in the interactive apparatus.

The content database 103 may include any suitable content. The content may include information that can be used in the interactive apparatus. Examples of such information include problems (e.g., questions, puzzles, riddles, quizzes), as well as songs, games, hints, music, facts, greetings, and messages (e.g., help, encouragement, reminders, or error messages). The content database 103 can also include code for electronic maps for different removable templates and different sheets. In addition, computer code for sheets with print elements can be present in the content database 103. The code can be downloaded to the user site 120 and can then be printed at the user site 120 using a printer. The sheets may contain any suitable print elements including characters, letters, numbers, animals, games, etc.

The content in the content database 103 may also be in any suitable form. For example, the content may be in the form of compressed or uncompressed data. The content may be in the form of sound files such as MP3 files, WAV files, and MIDI (Musical Instrument Digital Interface) files. The content may also be in the form of graphic files such as video files, image files (e.g., bitmaps), and text files.

At the user's site 120, a client computer 109 can be operatively coupled to a linker device 111. The client computer 109 can be an ordinary personal computer running a Windows™ based operating system. The linker device 111 may be coupled to the client computer 109 through a wireless or a wired link (e.g., a cable). The interactive apparatus 113 can receive computer code from the server computer 105 through the client computer 109 via the linker device 111.

The linker device 111 may be any suitable device capable of transferring data between the client computer 109 and the interactive apparatus 113. The linker device 111 could be, for example, a wireless transceiver such as a wireless RF (radio frequency) transceiver or an infrared transceiver. In preferred embodiments, however, the linker device 111 is capable of reading information from, and writing information to, the transferable information storage medium. In a typical embodiment, the transferable information storage medium may be a cartridge that can be inserted into both the linker device 111 and the base unit of the interactive apparatus 113. Using the linker device 111, data can be transferred to the interactive apparatus directly or indirectly.

Figure 10:
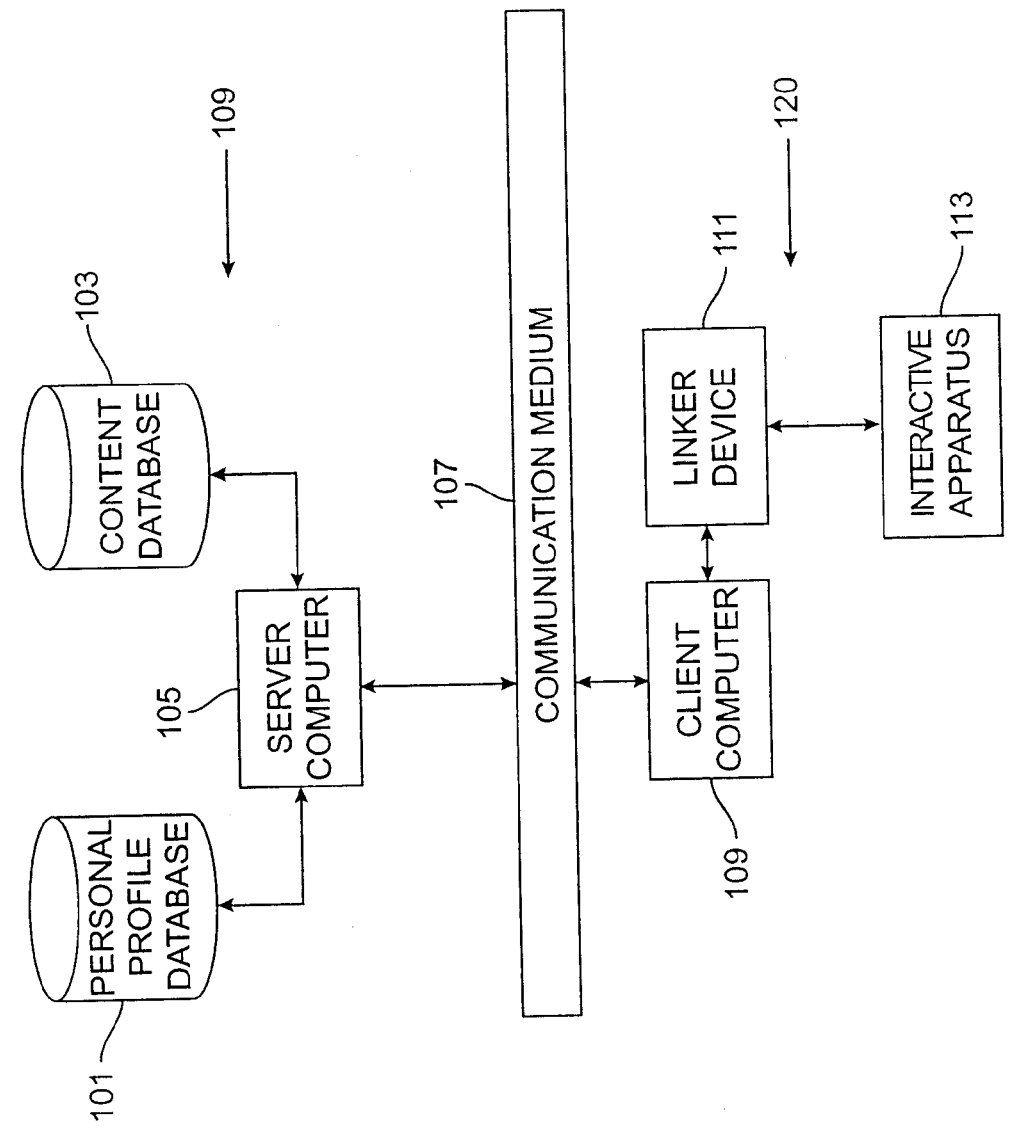
FIG. 10 shows a block diagram of a system according to an embodiment of the invention.

The system shown in FIG. 10 has a number of advantages. For example, by using the system shown in FIG. 10, a number of different sheets with different print elements can be downloaded to the user's site. Computer code (e.g., electronic maps) used to reprogram the interactive apparatus for new sheets can also be downloaded. Accordingly, the user is not limited to using a particular set of sheets that might be available at, for example, a local store. The user can have ready access to new and different content so that the interactive apparatus is more interesting to the user.

In some embodiments, the interactive apparatus can be used with other types of devices to form a set of devices that can be used, for example, to educate a child as the child grows. Each device (e.g., an educational toy) can be designed to educate a child in a certain age range. For example, the interactive apparatus according to embodiments of the invention can be designed to help educate children between the ages of 3 to 6 years old. Another device, such as an embodiment that is shown and described in U.S. Pat. No. 6,142,784 (which is assigned to the same assignee as the present invention and which is herein incorporated by reference in its entirety), can be used to educate children between the ages of 7 to 12 years of age. Other devices can be used to educate children from the ages 12 to 16, 1 to 3, etc. This set of devices can be used together as part of a personalized tutorial service so that a child has different types of devices that can complement each other and help a child learn as the child grows.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention. For example, any of the interactive apparatus embodiments with any suitable features described with reference to FIGS. 1–9 can be used with the system shown in FIG. 10 without departing from the scope of the invention.

What is claimed is:

1. An interactive apparatus comprising:
   a) a base unit comprising
      i) a substantially planar surface and
      ii) an array of electrical elements under the surface;
   b) a processor operatively coupled to the array of electrical elements;
   c) a memory operatively coupled to the processor;
   d) an audio output device operatively coupled to the processor; and
   e) a removable template over the surface of the base unit, wherein the removable template comprises a movable element that is over an electrical element in the array of electrical elements, wherein the electrical element is assigned to provide audio output that is related to the movable element.

2. The interactive apparatus of claim 1 wherein the array of electrical elements comprises an array of switches.

3. The interactive apparatus of claim 1 wherein the audio output device comprises a speaker.

4. The interactive apparatus of claim 1 wherein the audio output device is within the base unit.

5. The interactive apparatus of claim 1 wherein the removable template is adapted to educate the user about numbers or letters.

6. The interactive apparatus of claim 1 wherein the base unit comprises an edge region that at least partially defines the surface, and wherein the template is cooperatively structured to fit within the edge region.

7. The interactive apparatus of claim 1 wherein the interactive apparatus is a toy.

8. The interactive apparatus of claim 1 wherein the removable template comprises a substantially planar sheet of molded plastic.

9. The interactive apparatus of claim 1 wherein the removable template comprises a stationary region, and wherein the movable element moves independently of the stationary region and has a structure and an appearance that is distinct from the stationary region.

10. The interactive apparatus of claim 1 wherein the removable template comprises a stationary region, and wherein the movable element includes a portion that moves in a direction parallel to the plane of the removable template.

11. The interactive apparatus of claim 1 wherein the memory comprises a reprogrammable memory.

12. The interactive apparatus of claim 1 further comprising:
   a speech synthesizer.

13. The interactive apparatus of claim 1 wherein the base unit further comprises a slot and a transferable information storage medium that is removably insertable within the slot.

14. The interactive apparatus of claim 1 further comprising:
   a set of removable templates.

15. The interactive apparatus of claim 1 wherein the template comprises (i) a hinge, (ii) a first portion having a frame and (iii) a second portion having a frame, wherein the first portion and the second portion are coupled together with the hinge.

16. The interactive apparatus of claim 1 wherein the removable template comprises (i) a hinge, (ii) a first portion having a frame and an aperture in the frame, and (iii) a second portion having a frame, wherein the movable element is disposed in the frame of the second portion, wherein the first portion and the second portion are coupled together with the hinge, and wherein the movable element extends through the aperture in the frame of the first portion when the removable template is in a closed position.

17. The interactive apparatus of claim 1 wherein the removable template comprises (i) a hinge, (ii) a first portion having a frame and (iii) a second portion having a frame, wherein the first portion and the second portion are coupled together with the hinge, and
   wherein the interactive apparatus further includes a sheet that is disposed between the first portion and the second portion of the removable template, and
   wherein the sheet includes a plurality of print elements that are disposed over select electrical elements within the array of electrical elements, wherein the select electrical elements are assigned to retrieve audio output that relates to the print elements.

18. The interactive apparatus of claim 1 further comprising a selecting device for selecting a mode of operation.

19. The interactive apparatus of claim 1 wherein the movable element comprises a number or a letter.

20. The interactive apparatus of claim 1 wherein the interactive apparatus uses an asymmetric debounce technique to determine if the user is interacting with the sheet within a predetermined period of time.

21. A system comprising:
   a server computer;
   a client computer; and
   the interactive apparatus of claim 1.

22. A system comprising:
   a server computer;
   a client computer in communication with the server computer;
   a linker device coupled to the client computer; and
   the interactive apparatus of claim 1.

23. An interactive apparatus comprising:
   a) a base unit comprising
      i) a surface,
      ii) an array of switches under the surface,
      iii) a memory,
      iv) a processor operatively coupled to the array of switches and the processor,
      v) a slot, and
      vi) a speaker;
   b) a transferable information storage medium removably insertable in the slot; and
   c) a removable template over the surface of the base unit, wherein the removable template comprises a stationary portion and a plurality of movable elements, wherein each of the movable elements is capable of being moved while the stationary portion remains stationary and has a structure that is distinct from the stationary portion, and
   wherein the plurality of movable elements is disposed over a set of switches within the array of switches, each switch within the set of switches being assigned to provide output relating to the movable element that is disposed over the switch.

24. The interactive apparatus of claim 23 comprising:
   a set of removable templates.

25. The interactive apparatus of claim 23 wherein the transferable information storage medium is a data cartridge.

26. The interactive apparatus of claim 23 wherein the transferable information storage medium comprises a flash memory.

27. The interactive apparatus of claim 23 wherein the base unit further comprises an edge region that encircles the surface of the base unit, and wherein the edge region and the template are cooperatively structured.

28. The interactive apparatus of claim 23 wherein the transferable information storage medium comprises a flash memory.

29. The interactive apparatus of claim 23 wherein the interactive apparatus is an educational toy.

30. A system comprising:
   a server computer;
   a client computer; and
   the interactive apparatus of claim 23.

31. A system comprising:
   a server computer;
   a client computer in communication with the server computer;
   a linker device coupled to the client computer; and
   the interactive apparatus of claim 23.

32. A removable template for use over a surface of a base unit of an interactive apparatus, the removable template comprising:
   a) a stationary region; and
   b) a movable element that is structurally distinct from the stationary region and moves independently of the stationary region, and wherein the movable element comprises an upper portion capable of being moved by a user and a lower portion capable of contacting the surface in response to the movement by the user, and wherein the base unit produces an audio output that is related to the movable element.

33. The removable template of claim 32 further comprising a hinge, a first portion comprising a frame and an aperture in the frame, and a second portion comprising a frame having the stationary region and the movable element, wherein the first portion and the second portion are coupled together with the hinge, and wherein the movable element extends through the aperture in the frame of the first portion.

34. The removable template of claim 32 further comprising a plurality of the movable elements, wherein each movable element comprises a bright color.

35. A method of using an interactive apparatus, the method comprising:
   a) providing a base unit comprising a substantially planar surface;
   b) placing a removable template over the substantially planar surface;
   c) moving a movable element in the removable template; and
   d) producing an audio output that relates to the movable element in response to moving the movable element.

36. The method of claim 35 wherein the movable element is a first movable element and the removable template is a first removable template, and wherein the method further comprises:
   e) removing the first removable template from the base unit;
   f) placing a second removable template on the base unit, wherein the second removable template comprises a second movable element;
   g) moving the second movable element; and
   h) producing an audio output that relates to the second movable element in response to the movement of the second movable element.

37. The method of claim 35 wherein the removable template includes a frame, and wherein the method further comprises:
   e) securing a sheet comprising a print element to the surface of the base unit using the removable template;
   f) marking on the print element; and
   g) producing an output that relates to the print element.

38. The method of claim 35 wherein marking comprises coloring.

* * * * *

UNITED STATES PATENT AND TRADEMARK OFFICE
CERTIFICATE OF CORRECTION

PATENT NO.    : 6,641,401 B2
DATED         : November 3, 2003
INVENTOR(S)   : Michael C. Wood et al.

It is certified that error appears in the above-identified patent and that said Letters Patent is hereby corrected as shown below:

Drawing sheets, consisting of Fig. 1-11, should be deleted to be replaced with the drawing sheets, consisting of Figs. 1 thru 11-3, as shown on the attached pages.

Signed and Sealed this

Twenty-seventh Day of July, 2004

JON W. DUDAS
*Acting Director of the United States Patent and Trademark Office*

Activity Mode - Page P

| Shape/Object | Software cues | Click type | Activity mode" audio*Leap as narrator |
|---|---|---|---|
| Background | Underlining music plays while waiting for a Correct answer | | underlying music |
| Question #1 | There can be three questions which can be programmed sequentially, so that the child doesn't get the same sequence of questions each time. Default to music after question is asked | Question #1 of 3 w/o any coloring | Can you find the lette "P"? |
| Question #1 Hints | After 1st 5 seconds of inactivity | | 1a) We're looking for the letter "P" |
| | After 2nd 5 seconds of inactivity | | 1a) Can you find the letter "P" |
| | After 3rd 5 seconds of inactivity, go to sleep | | 1c) Thanks for learning with LeapFrog! Bye-Bye! |
| Correct Answer: Big Shape P (Big Letter) | Kill music | dt or drag | a1. Correct answer sfx |
| | | dt or drag | a2. Hooray! You found the letter "P" |
| Correct Answer: Letter "P" with line under it | Kill music | dt or drag | a1. Correct answer sfx |
| | | dt or drag | a2. Way to go! You found the letter "P" |
| Correct Answer: word pie inside bubble | Kill music | dt or drag | a1. Correct answer sfx |
| | | dt or drag | a2. Great Job! You found the letter "P" in the word pie. |
| | Please apply audio to all questions: After a correct answer response | dt or drag | Let's play again! |
| Incorrect Answer: Hint #1 | After 1st incorrect answer | dt or drag | a1. [Shape phrase]. We're looking for the letter "P". |
| Hint #2 | After 2st incorrect answer | dt or drag | a2. [Shape phrase]. We're looking for the letter "P". The letter "P" is big! |
| Hint #3 | After 3rd incorrect answer. Question #2 will kick in when finished. | dt or drag | a3. [Shape phrase]. Let's try another one. |
| Shape Phrase: Leap | | dt or drag | 1. I'm Leap! |
| Tad | | dt or drag | 1. I'm Tad! |
| The Pie | | dt or drag | 1. That's a piece of pie! |
| Edison | | dt or drag | 1. I'm Edison! |
| Letter "I" | | dt or drag | 1. That's the letter "I"! |
| Letter "E" | | dt or drag | 1. That's the letter "E"! |
| The Pan | | dt or drag | null |
| Question #2 | Question #2 will kick in after question #1 is finished. Default to music after question is asked | dt or drag - Question #2 of 3 | Can you find the piece of pie? |

FIG.11-1

Activity Mode - Page P

| | | | |
|---|---|---|---|
| Question #2 Hints | After 1st 5 seconds of inactivity | | 2a) We're looking for the piece of pie. |
| | After 2nd 5 seconds of inactivity | | 2b) Can you find the piece of pie? |
| | After 3rd 5 seconds of inactivity, go to sleep | | 2c) Thanks for learning with LeapFrog! Bye-Bye! |
| Correct Answer: The piece of pie | Kill music | dt or drag | a1. Correct answer sfx |
| | Kill music | dt or drag | a2. Hooray! You found the piece of pie! |
| Correct Answer: word pie inside bubble | Kill music | dt or drag | a1. Correct answer sfx |
| | Kill music | dt or drag | a2. Hooray! You found the word pie! |
| | Please apply audio to all questions: After a correct answer response | dt or drag | Let's play again! |
| Incorrect Answer: Hint #1 | After 1st incorrect answer | dt or drag | a1. [Shape phrase]. We're looking for the piece of pie! |
| Hint #2 | After 2nd incorrect answer | dt or drag | a2. [Shape phrase]. We're looking for the piece of pie! |
| Hint #3 | After 3rd incorrect answer. Question #3 will kick in when finished. | dt or drag | a3. [Shape phrase]. Let's try another one. |
| Shape Phrase: Leap | | dt or drag | 1. I'm Leap! |
| Tad | | dt or drag | 1. I'm Tad! |
| Edison | | dt or drag | 1. I'm Edison! |
| Big Letter "P" / Letter "P" | | dt or drag | 1. That's the letter "P"! |
| Letter "I" | | dt or drag | 1. That's the letter "I"! |
| Letter "E" | | dt or drag | 1. That's the letter "E"! |
| The Pan | | dt or drag | null |
| Question #3 | Question #3 will kick in after question #2 is finished. Default to music after question is asked | dt or drag Question #3 of 3 | Can you find Tad? |
| Question #3 Hints | After 1st 5 seconds of inactivity | | 3a) We're looking for Tad. |
| | After 2nd 5 seconds of inactivity | | 3b) Can you find Tad? |
| | After 3rd 5 seconds of inactivity, go to sleep | | 3c) Thanks for learning with LeapFrog! Bye-Bye! |
| Correct Answer: Tad | Kill music | dt or drag | a1. Correct answer sfx |
| | | dt or drag | a2. Great Job! You found Tad! |
| | Please apply audio to all questions: After a correct answer response | dt or drag | Let's play again! |
| Incorrect Answer: Hint #1 | After 1st incorrect answer | dt or drag | a1. [Shape phrase]. We're looking for Tad! |
| Hint #2 | After 2nd incorrect answer | dt or drag | a2. [Shape phrase]. We're looking for Tad! |
| Hint #3 | After 3rd incorrect answer. Question #1 will kick in when finished. | dt or drag | a3. [Shape phrase]. Let's try another one. |

FIG.11-2

Activity Mode - Page P

| Shape Phrase: | | | 1. I'm Leap! |
|---|---|---|---|
| Leap | | dt or drag | |
| The piece of pie | | dt or drag | 1. That's a piece of pie! |
| Word inside bubble | | dt or drag | 1. That's the word pie! |
| Edison | | dt or drag | 1. I'm Edison! |
| Big Letter "P" / Letter "P" | | dt or drag | 1. That's the letter "P"! |
| Letter "I" | | dt or drag | 1. That's the letter "I"! |
| Letter "E" | | dt or drag | 1. That's the letter "E"! |
| The Pan | | dt or drag | null |

FIG.11-3